United States Patent [19]
Fujita et al.

[11] Patent Number: 5,825,336
[45] Date of Patent: Oct. 20, 1998

[54] REMOTE OPERATION APPARATUS

[75] Inventors: Kenichi Fujita, Tokyo; Takeshi Nagao, Kawaguchi; Toru Kawaguchi, Matsudo; Shigeki Kaneko; Hiroyuki Hikita, both of Tokyo, all of Japan

[73] Assignee: Matsushita Electric Industrial Co., Ltd, Japan

[21] Appl. No.: 675,478

[22] Filed: Jul. 3, 1996

[30] Foreign Application Priority Data

Jul. 5, 1995 [JP] Japan .................................. 7-169467

[51] Int. Cl.⁶ .................................................. G06F 15/00
[52] U.S. Cl. ................................................ 345/2; 345/504
[58] Field of Search .................................. 345/2, 1, 331, 345/501, 502, 504; 395/135, 161, 610; 348/13

[56] References Cited

U.S. PATENT DOCUMENTS

| 5,136,695 | 8/1992 | Goldshlag et al. | 345/2 |
| 5,235,680 | 8/1993 | Bünagte | 395/161 |
| 5,493,638 | 2/1996 | Hooper et al. | 395/135 |
| 5,594,859 | 1/1997 | Palmer et al. | 345/2 |
| 5,604,509 | 2/1997 | Moore et al. | 345/2 |

FOREIGN PATENT DOCUMENTS 5119955 5/1993 Japan .

Primary Examiner—Steven J. Saras
Assistant Examiner—John Suraci
Attorney, Agent, or Firm—Rossi & Associates

[57] ABSTRACT

A remote operation apparatus comprises a MA term having a video display, an operation data generator, and a parameter data generator and at least a slave term, coupled to the MA term through at least a network, including operation data receiver, a video data generator and a display, a screen parameter receiver, and a video data acquiring portion. The operation data generator generates and transmits operation data to the video data generator of the slave term to generate and display video data. The screen parameter data generator generates screen parameter data indicating required video data and quality and transmits it to a video data acquiring portion acquiring the generated video data in the required region and quality and transmits it to the display of the MA term. A resource data of the networks and interface ckts is held by the slave term and is transmitted to the screen parameter data generator to utilize the resource data for generation of the screen parameter. The operation data generator may require to transmit drawing data to the slave term. The MA term holds imaginary screen including screen regions of slave terms. The operation data can be duplicated for another slave term. The video data in one slave term is duplicated in the memory in the MA term and transmitted to another slave term.

6 Claims, 20 Drawing Sheets

FIG. 2
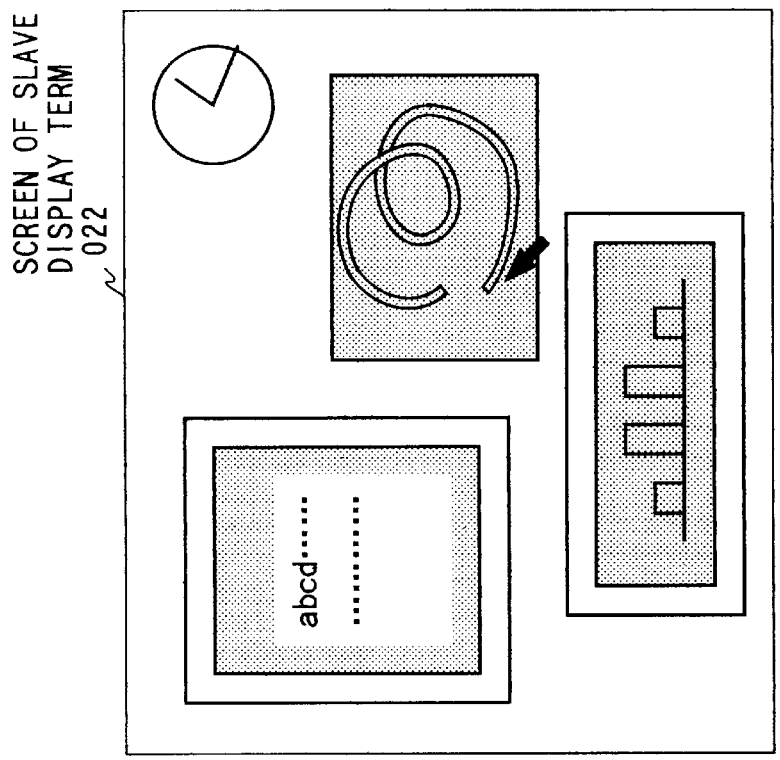
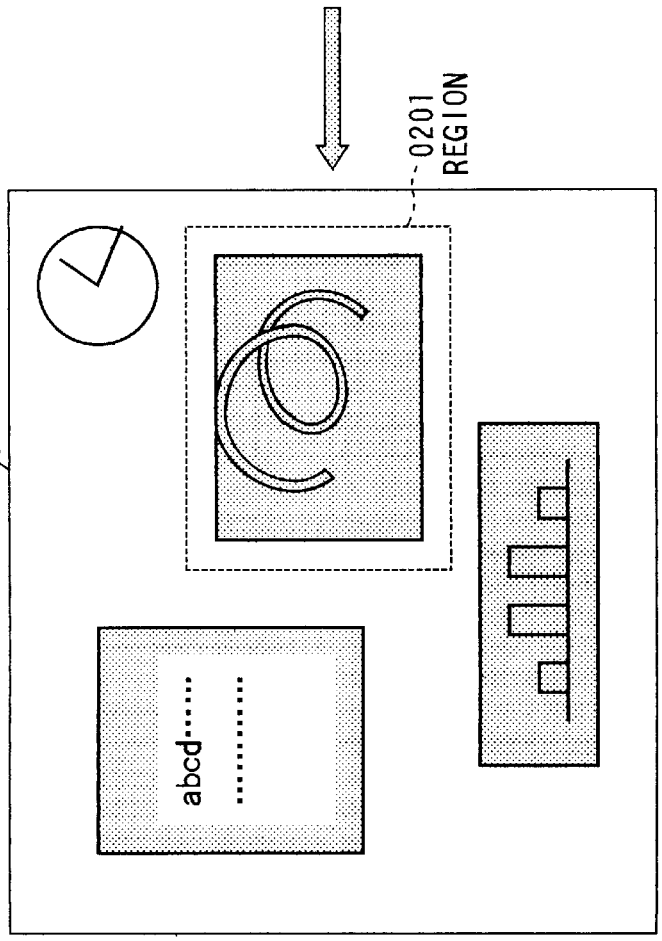

|  | MASTER TERM | | SLAVE TERM | |
|---|---|---|---|---|
|  | START POINT | SIZE | START POINT | SIZE |
|  | 100, 100 | 200, 200 | 100, 100 | 200, 200 |

| SCREEN DATA | SCREEN PARAMETER | | | |
|---|---|---|---|---|
|  | REGION (START POINT) | REGION (END POINT) | XMSN DATA RATE | COLOR |
| 1 | 0, 0 | 1200, 800 | 0.1 | MONO |
| 2 | 100, 200 | 300, 300 | 5 | FULL |

| TERM | NETWORK | CHAN | HARDWARE | XMSN CAP | REGION | XMSN DATA |
|---|---|---|---|---|---|---|
| SLAVE DISPLAY TERM 052 | 10BASET | — | MOVING PICTURE COMP BOARD A | 2M | 640*480 (WITHIN) | MAX 15 FRAMES/SEC |
| | 10BASET | — | MOVING PICTURE COMP BOARD B | 1.5M | 320*240 | MAX 25 FRAMES/SEC |
| | COAXIAL CABLE | CHAN 20 | CODEC | — | 640*480 (WITHIN) | MAX 30 FRAMES/SEC |
| MASTER DISPLAY TERM 051 | 10BASET | — | MOVING PICTURE COMP BOARD A | — | 640*480 (WITHIN) | — |
| | COAXIAL CABLE | — | CODEC | — | 640*480 (WITHIN) | — |
| | ATM | — | MOVING PICTURE COMP BOARD C | — | 800*600 | — |

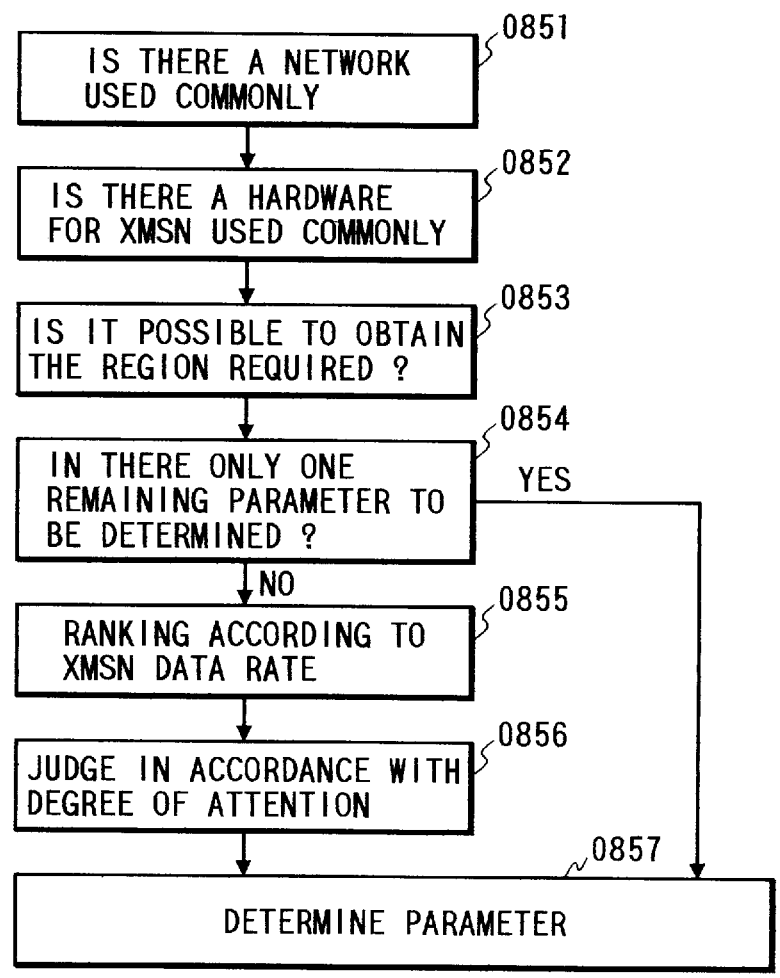

| TERM | REGION | CONTRACTION SCALE |
|---|---|---|
| SLAVE DISPLAY TERM 102 | WHOLE | 1/4 |
| SLAVE DISPLAY TERM 103 | WHOLE | 1/4 |
| SLAVE DISPLAY TERM 104 | WHOLE | 1/4 |
| SLAVE DISPLAY TERM 105 | WHOLE | 1/4 |

| TERM | REGION | CONTRACTION SCALE |
|---|---|---|
| SLAVE DISPLAY TERM 102 | (600, 500) ~ (1200, 1000) | 1 |
| SLAVE DISPLAY TERM 103 | (0, 500) ~ (600, 1000) | 1 |
| SLAVE DISPLAY TERM 104 | (600, 0) ~ (1200, 500) | 1 |
| SLAVE DISPLAY TERM 105 | (0, 0) ~ (600, 500) | 1 |

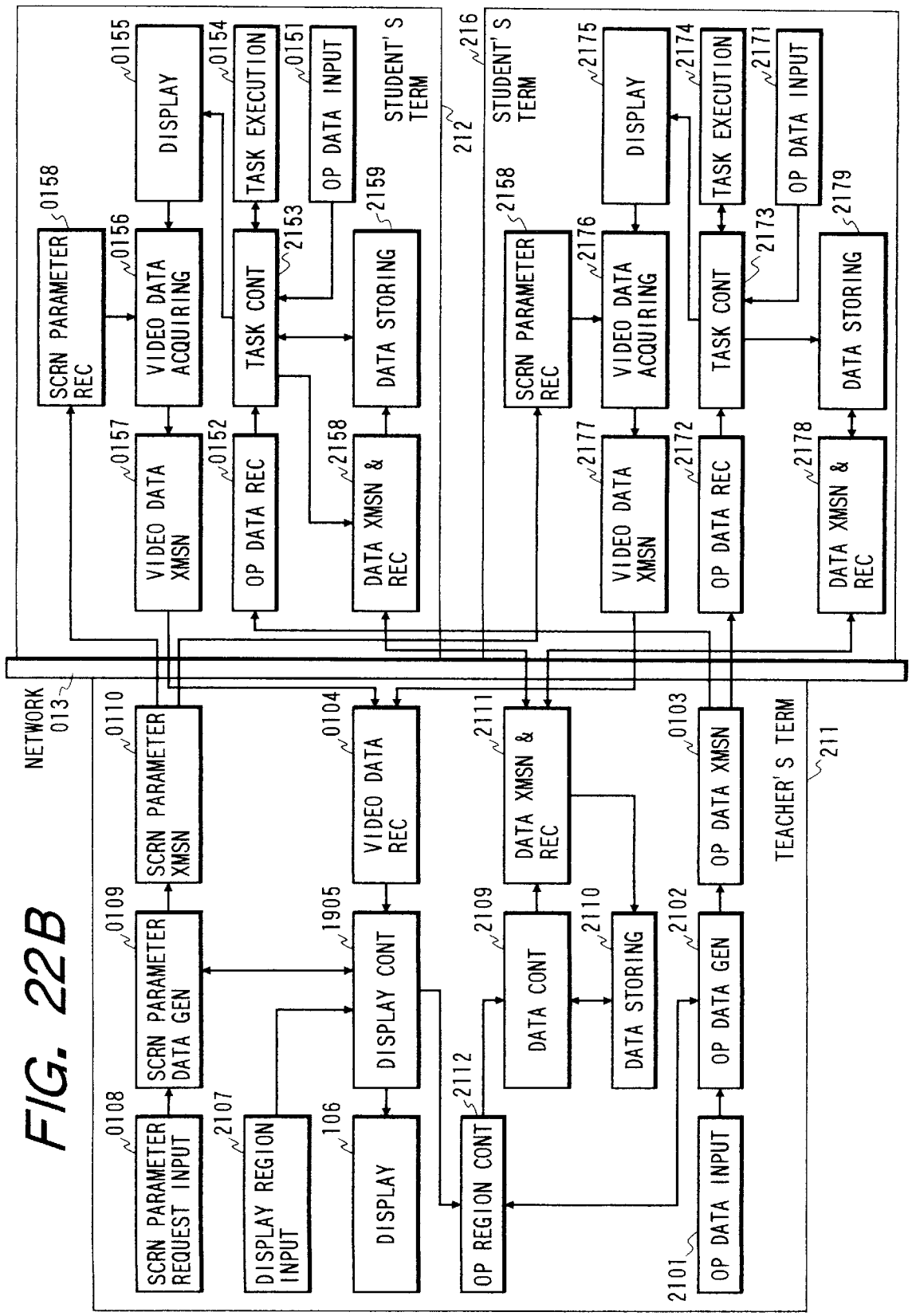

REMOTE OPERATION APPARATUS

BACKGROUND OF THE INVENTION

1. Field of the Invention

This invention relates to a remote operation apparatus having remote display terminals for processing and displaying video data with remote control processing.

2. Description of the Prior Art

There are two types of remote operation apparatus including display terminals for processing and displaying video data with remote control processing.

In the first type of the remote operation apparatus, remote display terminals have common application softwares for displaying and one of display terminals sends video information such as a drawing command (straight line drawing command for example) through a transmission line to respectively change video images on both display terminals commonly through the common application softwares.

In the second type of the remote operation apparatus, one of remote display terminals sends a resultant video data (including luminance data and color data, etc.) to another display terminal to provide common video images.

FIG. 24 is a block diagram of the first type of a prior art remote operation apparatus. In this remote operation apparatus, when an operator of a master display terminal 241 operates an operational data input circuit 2401 such as a keyboard, operational data is generated and sent to the task control portion 2453 in the slave terminal 242. In response to the operational data, a task processing portion 2454 executes tasks using application softwares to generate a drawing command. The drawing command is sent to a display portion 2455 of the slave display terminal 242 which displays an image corresponding to the drawing command such as the straight line drawing command. The drawing command is also sent to a display portion 2406 of the master display terminal 241 which also displays the image corresponding to the drawing command. Therefore, common display images are provided in both remote display terminals through common programs between the master and slave display terminals. This type of the prior art remote operation apparatus is known as SharedX by HEWLETT PACKARED in U.S.A. and XTV by University of North Carllina at Chapel Hill in U.S.A.

FIG. 25 is a block diagram of the second type of a prior art remote operation apparatus. In this remote operation apparatus, the display image on the display 2555 of the slave display terminal 252, which is made in response to operational data transmitted from the master display terminal 251 or the operation data input circuit 2551 is sent to the master display terminal 251 as video data acquired by a display data acquiring portion 2556. The video data may be compressed for transmission.

This types of remote operation apparatus is disclosed in Japanese patent application provisional publication No. 5-119955.

SUMMARY OF THE INVENTION

The aim of the present invention is to provide an improved remote operation apparatus.

According to this invention, a first remote operation apparatus is provided, which comprises a master display terminal and at least a slave display terminal, coupled to the master terminal through at least a network, to be remote controlled by the master display terminal, the master display terminal including: a video data receiving portion for receiving first video data from the slave display terminal; a first display portion, having a first display; a display control portion for operating the first display portion to display a first image in accordance with the first video data with positions of the first image controlled in accordance with first positional data; a screen parameter data input portion for inputting a request; a screen parameter data generation portion responsive to the inputted request for generating screen parameter data including the first positional data; a screen parameter transmission portion for transmitting the screen parameter data to the slave display terminal; a first operational data input portion for receiving first operational data input; an operational data generation portion for generating first operational data in accordance with the first operational data input and converting the first positional data to second positional data; and an operational data transmission portion for transmitting the first operational data and second positional data to the slave display terminal, the slave display terminal including: an operational data receiving portion for receiving the first operation data and the second positional data from the operational data transmission portion through the least network; a second operational data input portion for inputting second operational data; a task operation portion including a plurality of tasks and a task detection portion, wherein the task detection portion detects one of the plurality of tasks corresponding to the first operational data and the received second positional data and the task operation portion supplying the first operational data and the second positional data from the operational data receiving portion to the detected one of the plurality of tasks to operate it to generate a first drawing command using the second positional data when the operational data receiving portion receives the first operation data and the second positional data, the task detection portion detects one of the plurality of tasks corresponding to the second operational data and the received position data and the task operation portion supplying the second operational data and position data from the second operational data input portion to the detected one of the plurality of tasks corresponding to the second operational data and the position data to operate it to generate a second drawing command when the second operational data input portion receives the second operational data and the position data, a second display portion, having a second display, for generating second video data in accordance with the first and second drawing command to display a second image on the second display; a screen parameter receiving portion for receiving the screen parameter data from the screen parameter transmission portion; a screen data acquisition portion for generating the first video data from the second video data from the second display portion in accordance with the screen parameter data from the screen parameter receiving portion; and a video data transmission portion for transmitting the first video data from the video data acquisition portion to the video data receiving portion.

In the first remote operation apparatus, the video data transmission portion has a plurality of transmission modes for transmitting the video data, the slave display terminal further comprises a resource video data control portion for holding and controlling resource data indicative of the transmission modes and a resource video data transmission portion for transmitting the resource data to the master display terminal, and the master display terminal further comprises a resource data receiving portion for receiving the resource data from the resource data transmission portion and a second resource data control portion for holding the resource data from the resource data receiving portion and generate resource control data, and the screen parameter data generation portion generates the screen parameter data in accordance with the resource control data in addition to the request.

In the first remote operation apparatus, the screen parameter data input portion further receives a second request indicative of requiring the first and second drawing command and the screen parameter data generation portion generates the screen parameter data indicative of the second request, the screen parameter transmission portion transmits the screen parameter indicative of the second request via the screen parameter receiving portion to the task operation portion, the slave display terminal further comprises a drawing command transmission portion, the task operation portion transmits the first and second drawing command to the master display terminal in response to the parameter data indicative of the second request from the screen parameter transmission portion, the master display terminal further comprises a drawing command receiving portion for receiving the first and second drawing command from the drawing command transmission portion, and the display control portion further responses to the first and second drawing command from the drawing command receiving portion during operating the first display portion.

In the first remote operation apparatus, at least a slave display terminal comprises first and second slave video terminals to which first and second addresses assigned respectively, the display control portion stores third positional data of screen areas of the first and second slave display terminals such that the screen areas form an imaginary screen area having coordinates, each of the screen areas being uniquely represented by the third positional data on the coordinates, and the master video terminal 101 further comprises: a display region input portion for inputting and supplying a display request including fourth positional data on the coordinates indicative of a region at the screen area of the first slave display terminal to the display control portion, the display control portion Judging which of the first and second address data corresponds to the region by comparing the fourth positional data with the third positional data and converting the fourth positional data to the first positional data and operating the screen parameter data generation portion to generate the screen parameter data in accordance with the display request so as to operate one of the first and second slave display terminals to transmit the first video data of an image at the region of the one of the first and second slave display terminals which is selected in accordance with the judged address, to the master display terminal.

In the first remote operation apparatus, at least a slave display terminal comprises first and second slave video terminals, the master display terminal further comprises operational data storing portion for storing the first operational data and an operational data copy request input portion for receiving an operational data copy request, the operational data generation portion generates second operational data by duplicating the first operational data, and the operation data transmission portion transmits the second operational data to the second slave display terminal.

In the first remote operation apparatus, at least a slave display terminal comprises first and second slave video terminals, the first operational data input portion further receives a data transmission request, the operational data generation portion generates the first operational data indicative of the data transmission request, the master display terminal further comprises a data control portion, a first data transmission and receiving portion, and a first data storing portion, the operational data generation portion generates the first operational data indicative of the data transmission request, the operational data transmission portion transmits the first operational data indicative of the data transmission request to the task-operation portion via the operation data receiving portion of the first slave display terminal, the first and second slave display terminals further include second and third data storing portions and second and third data transmission and receiving portions respectively, the task operation portion of the first slave display terminal operates one of the plurality of tasks corresponding the first operational data indicative of the data transmission request to generate data and store the data in the second data storing portion of the first slave display terminal and operates the second data transmission and receiving portion of the first slave display terminal to transmit the data to data transmission and receiving portion of the master display terminal, the first data storing portion stores the data from the first data transmission and receiving portion, the operational data input portion further receives a data pasting request, in response to the first operational data indicative of the data pasting request, the operational data generation portion generates the first operational data indicative of the data pasting request, the data control portion reads the data in the first data storing portion and transmits the data from the first data storing portion to the third data transmission and receiving portion of the second slave display terminal, the third data storing portion of the second slave display terminal stores the data from the third data transmission and receiving portion of the second slave display terminal to supply the data in the second data storing portion to the task control portion of the second slave display terminal.

BRIEF DESCRIPTION OF THE DRAWINGS

The object and features of the present invention will become more readily apparent from the following detailed description taken in conjunction with the accompanying drawings in which:

FIG. 2 is an illustration of screens of master and slave display terminals shown in FIG. 1;

FIG. 10 is a functional diagram of the second embodiment showing a flow chart of generating the screen parameter data;

FIG. 11 is an illustration of the second embodiment showing an example of determined parameter data;

FIG. 22B is a functional block diagram of a modification of the remote operation apparatus;

The same or corresponding elements or parts are designated with like references throughout the drawings.

DETAILED DESCRIPTION OF THE INVENTION

Figure 26:
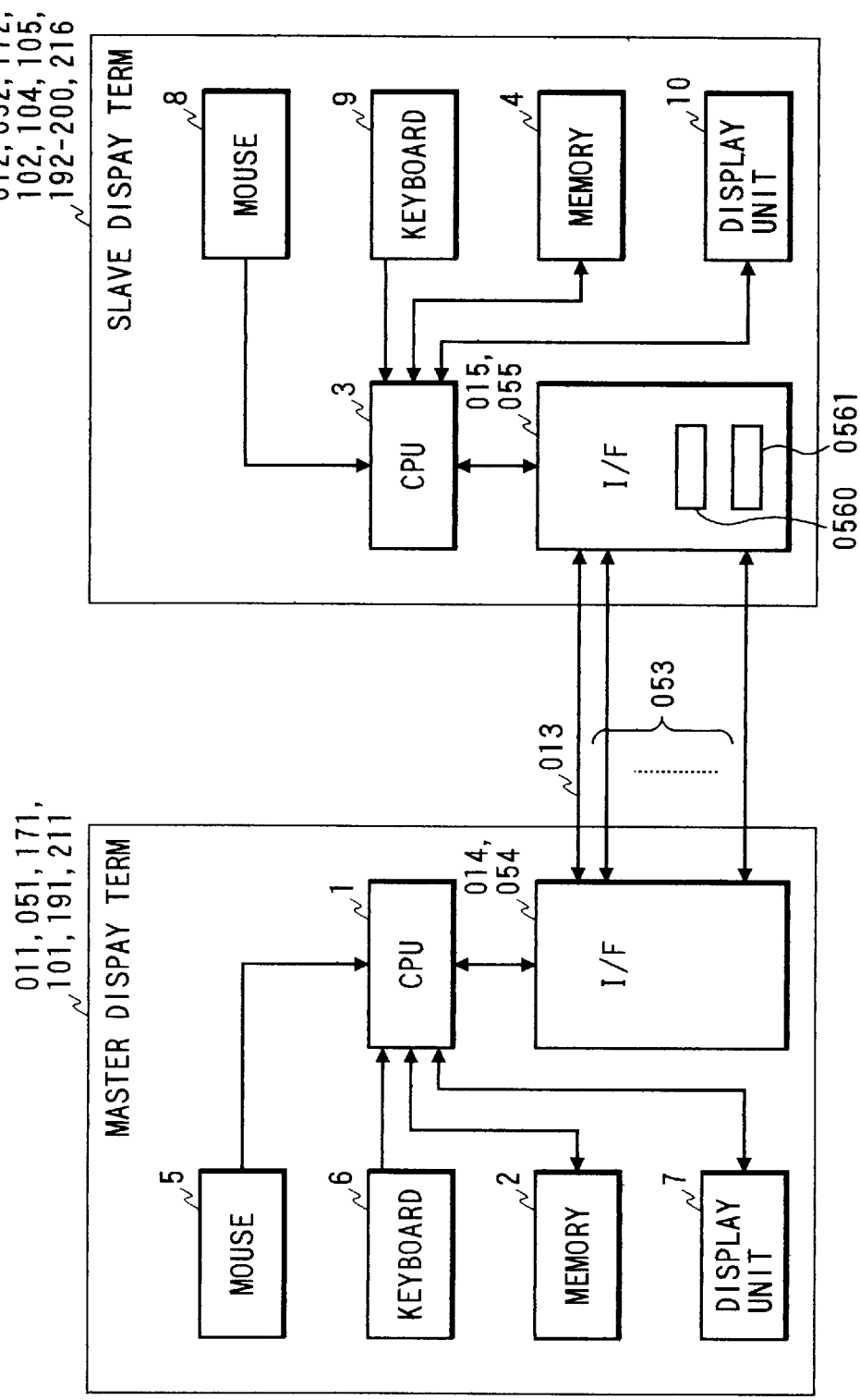
FIG. 26 is a general circuit block diagram of each of remote operation apparatus of first to sixth embodiments.

A remote operation apparatus of this invention comprises a master display terminal and at least a slave terminal coupled to the master display terminal through at least a network. FIG. 26 is a general circuit block diagram of each of remote operation apparatus of first to sixth embodiments. The master display terminal 011, 051, 171, 101, 191, or 211 comprises a cpu (central processing unit) 1, a memory 2 including a hard disc unit, a ROM, and a RAM, a mouse 5 for inputting a mouse input signal, a key board 6 for inputting a key board inputting signal, a display unit 7 for displaying an image, and an interface unit 014 or 054 including at least an interface circuit (not shown) for interfacing with at least a network.

The slave display terminal 012, 052, 172, 102, 192–200, or 216 comprises a cpu (central processing unit) 3, a memory 4 including a hard disc unit (not shown), a ROM (not shown), and a RAM (not shown), a mouse 8 for inputting a mouse input signal, a key board 6 for inputting a key board inputting signal, a display unit 10 for displaying an image, and an interface unit 015 or 055 including at least an interface circuit (not shown) for interfacing with at least a network.

Figure 1:
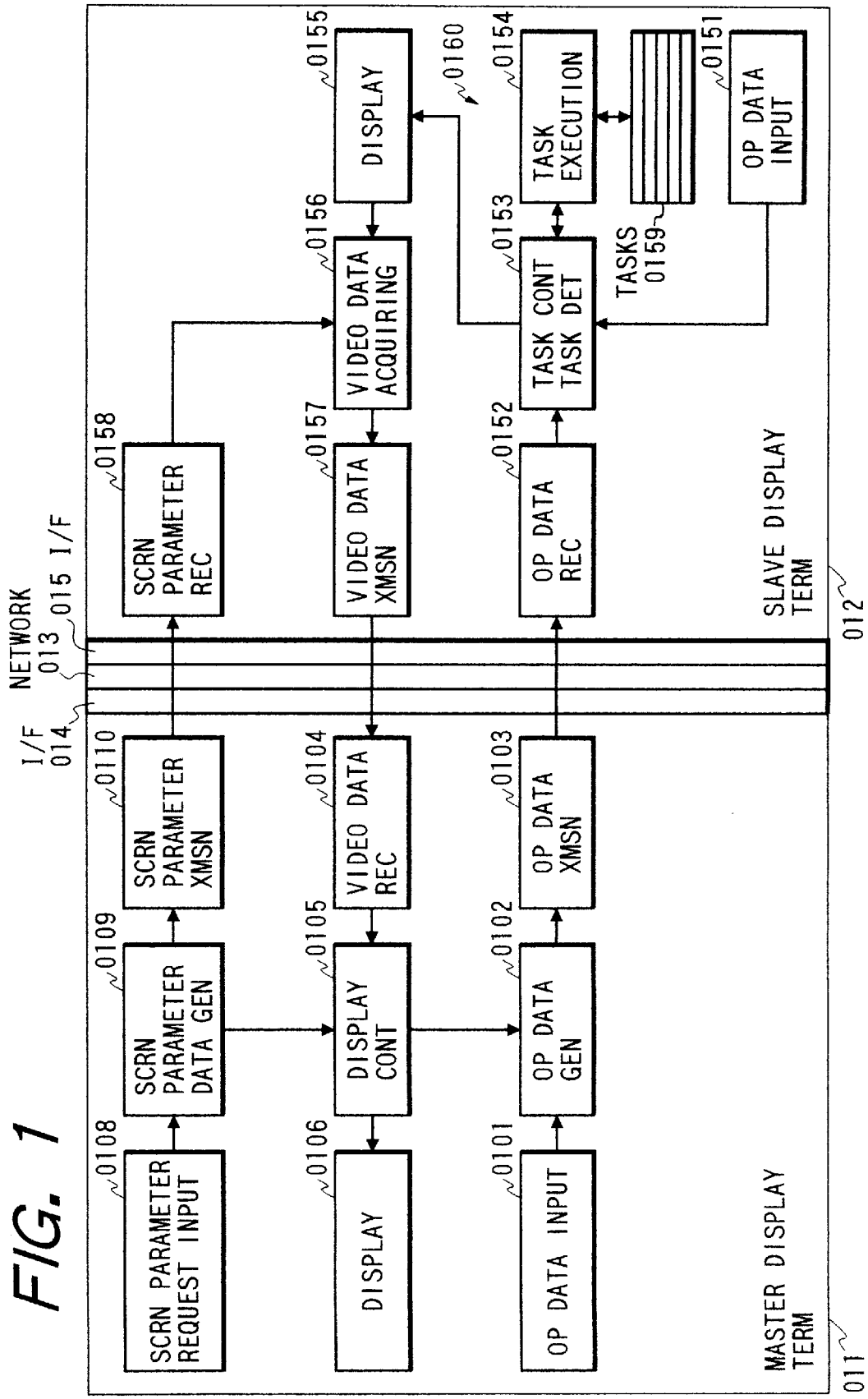
FIG. 1 is a functional block diagram of a remote operation apparatus of a first embodiment.

Hereinbelow will be described a first embodiment of this invention. FIG. 1 is a functional block diagram of a remote operation apparatus of the first embodiment, wherein functions of respective blocks are provided by the programs stored in the memory 2 or 4 in cooperation with other units of the mouse 5 or 8, the keyboard 6 or 9, the display unit 7 or 10, or the interface unit 014 or 015.

The remote operation apparatus of the first embodiment comprises a master display terminal 011 and at least a slave display terminal 012 coupled to the master terminal 011 through at least a network 013. The master display terminal 011 includes a video data receiving portion 0104 for receiving video data from the slave terminal 012, a display portion 0106, having the display unit 7, a display control portion 0105 for operating the display portion 0106 to display an image in accordance with the video data from the slave display terminal 012 and generating display position data in accordance with display position data supplied from a screen parameter data generation portion 0109 mentioned later and the video data from the video data receiving portion, a screen parameter data input portion 0108 for inputting a request, the screen parameter data generation portion 0109 responsive to the inputted request for generating screen parameter data and the display position data, a screen parameter transmission portion 0110 for transmitting the screen parameter data to the a slave display terminal 012, a first operational data input portion 0101 for inputting first operational data, an operational data generation portion 0102 for generating operational data in accordance with the inputted operational data and the display position data from the display control portion 0105, and an operational data transmission portion 0103 for transmitting the operational data to the slave display terminal 012.

The slave display terminal 012 includes an operational data receiving portion 0152 for receiving the operation data from the operational data transmission portion 0103 through the network 0113, a second operational data input portion 0151 for inputting second operational data, a task operation portion 0154 including a plurality of tasks, each generating a display command, a task control portion 0153 for supplying first and second operational data from the first or second operational data input portion to one of the plurality of tasks indicated by the first or second operational data to operate it to generate a display command, a second display portion 0155, having the display unit 10, for generating a second video data in accordance with the display command to display an image on the display, a screen parameter receiving portion 0158 for receiving the screen parameter data from the screen parameter transmission portion 0110, a screen data acquisition portion 0156 for generating the first vide data from the second video data from the second display portion 0155 in accordance with the screen parameter data from the screen parameter receiving portion 0158, and a video data transmission portion 0157 for transmitting the video data to the screen data receiving portion 0104.

An operation will be described.

The video data receiving portion 0104 receives the video data transmitted from the slave display terminal 012. The display control portion 0105 receives the video data from the slave display terminal 012 and sends it to the display portion 0106 and transmits the display position data to the operational data generation portion 0102. The display position data includes coordinate position data and a region on the display of the master display terminal 011 and coordinate position data and a region on the display of the slave display terminal 012.

The operational data input 0101, using the keyboard 6 or the mouse 5, receives an input signal through the keyboard 6 or the mouse 5 and converts it into the operational data for the slave display terminal 012. The operational data generation portion 0102 receives the operational data and the display position data from the display control portion 0105 and converts the display position data for the slave display terminal 012. The operational data transmission portion 0103 transmits the operational data and the converted display position data to the slave display terminal 012.

Moreover, the master display terminal 011 transmits screen parameters indicative of an amount, a quality, region, an enlargement ratio of video data transmitted to this master display terminal 011 to the slave display terminal 012.

The screen parameter request input portion 0108 provides an interfacing program and receives a request of the user using the interfacing program. The screen parameter data generation portion 0109 generates the screen parameter data in response to the request. The screen parameter transmission portion 0110 transmits the screen parameter data to the slave display terminal 012.

In the slave display terminal 012, the operational data receiving portion 0152 receives the operational data from the master terminal 011. The task control portion 0153 receives the operational data from the operation data receiving portion 0152 and transmits the operational data from the master display terminal 011 and the operational data of the slave display terminal 012 received by the operation data input portion 0151 to one of tasks, provided in the slave display terminal 012, which corresponds to the operational data and sends the display command from the task execution portion 0154 to the display portion 0155.

The task execution portion 0154 executes one of tasks under control of the task control portion 0153. The screen parameter receiving portion 0158 receives screen parameter from the master display terminal 011. The video data acquiring portion 0156 acquires video data from the display portion 0155 in accordance with the screen parameter from the screen parameter receiving portion 0158. The acquired video data is transmitted to the master display terminal 011 from the video data transmission portion 0157.

The operation will be described more specifically.

In this embodiment, it is assumed that the remote operation apparatus of this embodiment includes one master display terminal 011 and one slave display terminal 012. Moreover, it is assumed that the slave display terminal 012 transmits video data of a still picture and the master display terminal 011 transmits the screen parameters including data of the region, a transmission speed (frame rate), the number of colors. Then, operations of transmission and reception of the screen parameter and the video data will be described more specifically.

Figures 3, 4, 5:
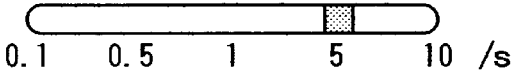
FIG. 3 is an illustration of the first embodiment showing an image on the master display terminal for generating operational data.
FIG. 4 is an illustration of the first embodiment showing positional data sent to the display control portion shown in FIG. 1.
FIG. 5 is an illustration of the first embodiment showing an example of data of parameters in the video data acquiring portion shown in FIG. 1.

FIG. 2 is an illustration of screens of the master and slave display terminals shown in FIG. 1. FIG. 3 is an illustration of an image on the master display terminal for generating operational data.

The slave display terminal 012 transmits the video data of the whole screen at one frame per ten seconds as a monochrome image. The master display terminal 011 displays the video data to have the whole image.

An operator of the master display terminal 011 operates the operational data input portion 0101 (a mouse or the keyboard) to process the image which is transmitted by the slave display terminal 012 with the same feeling as the operator operates the image generated by the master display terminal 011. The operation data generation portion 0102 converts the operational data to have coordinates positions of the slave display terminal 012. The result is transmitted to the executed task via the operation data transmission portion 0103, the operation data receiving portion 0152, and the task control portion 0153.

The task processes the operational data as similar to the processing the video data in response to the operation data input circuit 0151 of the slave display terminal 012 and outputs the result on the display 0155. The video data acquisition portion 0156 acquires the video data from the display 0155 in accordance with the present screen parameters, that is, the video data of the still image which represents a whole screen in a monochrome manner, is transmitted at one frame per ten seconds. The acquired video data is transmitted to the video display control portion 0105 of the master display terminal 011 via the video data transmission portion 0157 and the video data receiving portion 0104.

The video display control portion 0105 supplies a display command to the display 0106 to display the image from the slave display terminal 012 on the display 0106. As mentioned, the operational data inputted on the master display terminal 011 is transmitted to the task in the slave display terminal 012 corresponding to the operational data. Then, as the result of execution of the task with the operational data, the image modified in accordance with the operational data can be displayed on the master display terminal 011.

Then, it is assumed that the operator of the master display terminal 011 desires to obtain an image at the region 0201 with a higher quality. Then, the operator inputs the operational data including data of the region, the frame rate, the number of colors as shown in FIG. 3.

FIG. 3 shows an example image during inputting the screen parameters. That is, screen parameters including the region (100, 100) to (300, 300), the frame rate of 5 frames per second, and a full color mode are transmitted to the video data acquiring portion 0156 of the slave display terminal 012 through the screen parameter data generation portion 0109, the screen parameter transmission portion 0110, and the screen parameter receiving portion 0158.

The video data acquiring portion 0156 holds screen parameters of the master display terminal 011 and the slave display terminal 012 as shown in FIG. 5.

The screen parameter data generation portion 0109 also generates positional (display position) data as shown in FIG. 4 and transmits it to the display control portion 0105 and acquires the video data in accordance with the data of parameters and transmits it through the video data transmission portion 0157.

On the display 0106 of the master display terminal 011, two types of images are selectively shown or shown in an overlay manner in accordance with two sets of parameters shown in FIG. 5. Thus, on the display of the master display terminal 011, the whole image can be shown with a rough movement the partial image under attention can be shown more indicatively with a smooth movement.

As mentioned above, according to this embodiment, the operator of the master display terminal 011 can obtain the image in accordance with the inputted parameters with a necessary movement, a necessary quality of images or the like, so that capabilities of the network 013, the master display terminal 011 and the slave terminal 012 can be efficiently utilized.

A second embodiment will be described.

Figure 6:
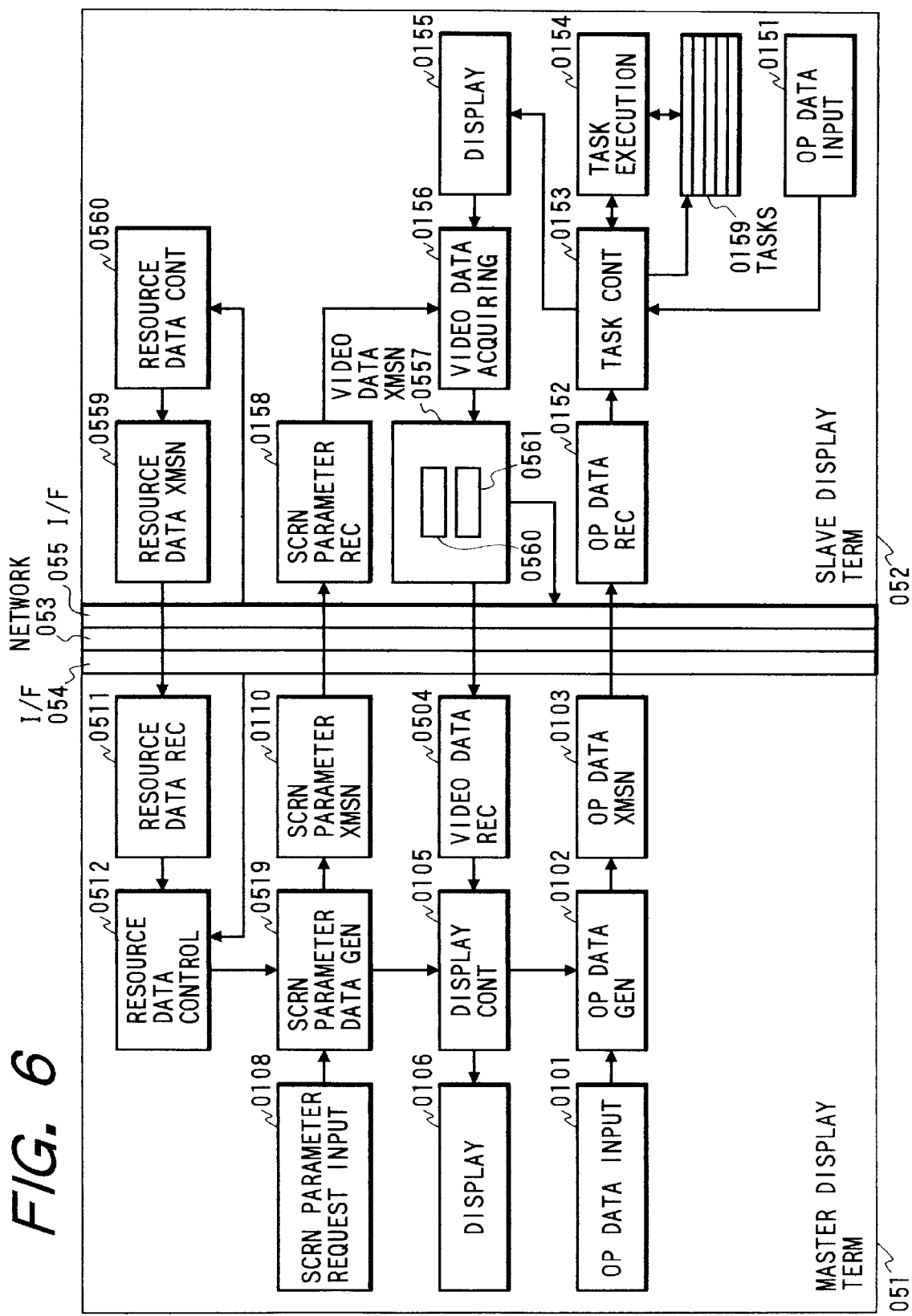
FIG. 6 is a functional block diagram of a remote operation apparatus of a second embodiment.

FIG. 6 is a functional block diagram of a remote operation apparatus of the second embodiment, wherein functions of respective blocks are provided by the programs stored in the memory 2 or 4 in cooperation with other units of the mouse 5 or 8, the keyboard 6 or 9, the display unit 7 or 10, or the interface unit 014 or 015.

A structure and an operation of the second embodiment is similar to those of the first embodiment basically. A difference between the first and second embodiments is as follows:

The video data transmission portion 0557 has a plurality of transmission modes for transmitting the video data. For example, the slave display terminal 052 is coupled to a plurality of networks 053 and can transmits the video data to the master display terminal 051 through digital LAN using 10 BASE-T, ATM and an analog video data transmission line using a coaxial cable or the like. The video data transmission portion 0557 further comprises moving picture compression boards 0560 for converting video data into MPEG or JPEG format with data compression/extension, and codec circuits 0561 for codec operations and the interface unit 055 is controlled by the video data transmission circuit 0557 to selectively operate these circuits. The video data receiving portion 504 includes the circuits for receiving the video data from the moving picture compression boards 0560, and codec circuits 0561. The interface unit 055 generates and sends conditional (resource) data of networks and circuits operated in the interface unit 055 to the resource data control portion 0560 in the slave display terminal 052. The video data transmission portion 0557 operates the interface unit 055 to select one of networks suitable for transmitting video data in accordance with the type of the video data.

The slave display terminal 052 further comprises the resource video data control portion 0560 for receiving and holding and controlling resource data indicative of a condition of transmitting video data, i.e., transmission modes and a resource video data transmission portion 0559 for transmitting the resource data to the master display terminal 051. The master display terminal 051 further comprises a resource data receiving portion 0511 for receiving the resource data from the resource data transmission portion 0559 and a second resource data control portion 0512 for holding the resource data from the resource data receiving portion 0511 and generating resource control data. A screen parameter data generation portion 0509 generates the screen parameter data in accordance with the resource control data in addition to the inputted request as mentioned in the first embodiment.

The resource data includes data of kinds and capacities of available networks and data of kinds and capacities of available moving picture boards provided in the vide data transmission portion 0557.

The resource data control portion 0560 holds the resource data. The resource data transmission portion 0559 sends the resource data to the resource data receiving portion 0511 of the master display terminal 051 through interface units 054 and 055 and one of networks 053 at a timing where there is a change in the condition of transmission. The resource data received by the resource data receiving portion 0511 is held by the resource data control portion 0512. The resource data control portion 0512 holds the resource data of the slave terminal 052 and other slave terminals if other slave terminals coupled to the master display terminal 051. The resource data control portion 0512 also holds the resource data of the master display terminal 051 itself from the interface unit 054.

When a request is received by the screen parameter request input portion 0108, the screen parameter data generation portion 0509 receives this request and receives the resource data of the concerning slave display terminal 052 and the master display terminal 051 from the resource data control portion 0512. The screen parameter data generation portion 0509 determines screen parameter data for transmitting video data from the slave display terminal 052 in accordance with the request by the operator of the master display terminal 051, the resource data of the concerning slave display terminal 052, and the resource data of the master display terminal 051.

Figure 7:
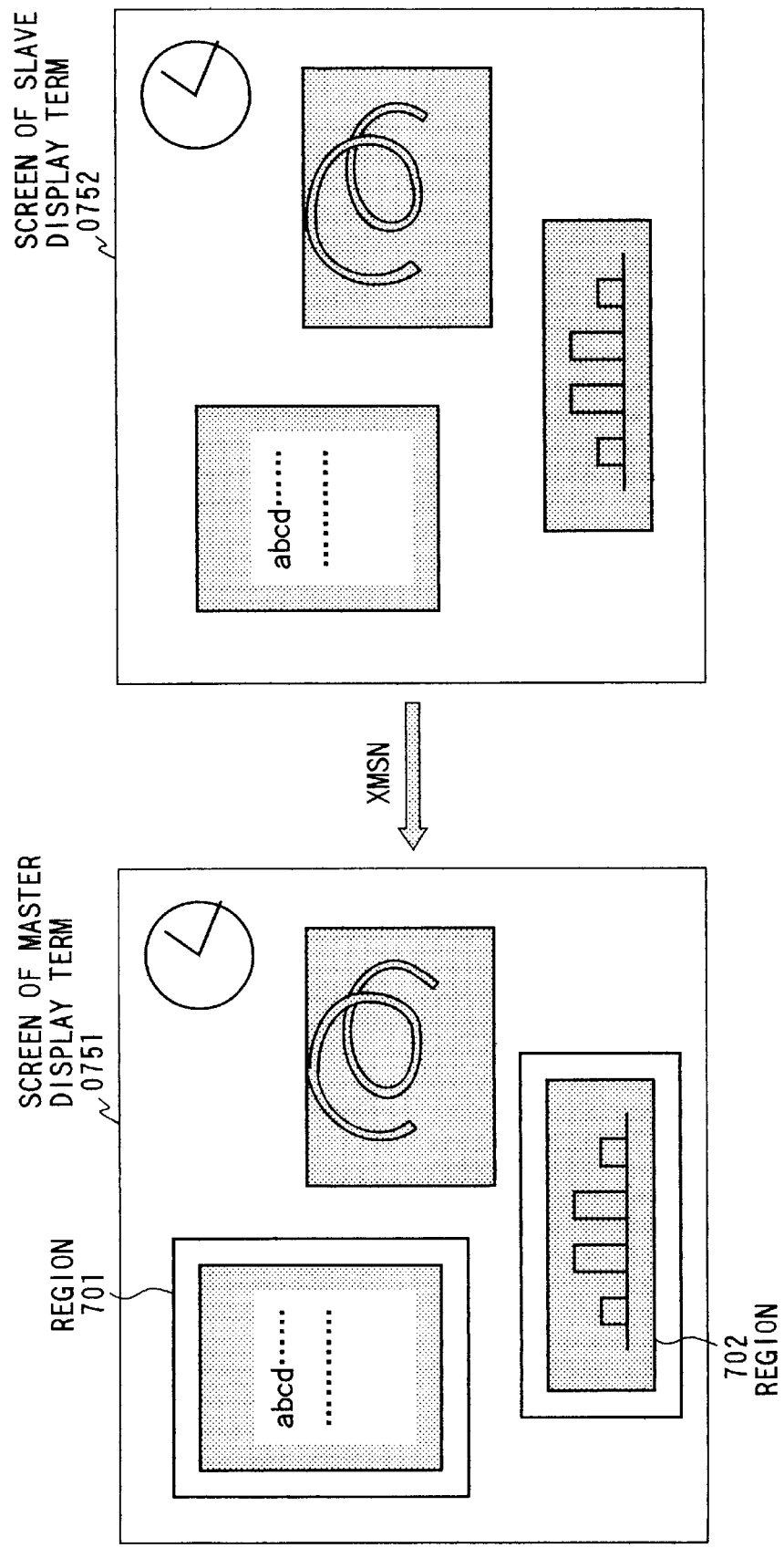
FIG. 7 is an illustration of the second embodiment showing an example of screens of the master display terminal and the salve display terminal.

FIG. 7 is an illustration of the second embodiment showing an example of screens of the master display terminal 051 and the salve display terminal 052.

The slave display terminal 052 monochromatically transmits the video data of the whole screen image thereof at one frame per ten seconds and the master display terminal 051 displays the transmitted screen image on the whole screen area of the display. The video data transmission portion 0557 operates the interface unit 053 to transmit the video data through a network of 10 BASE-T included in the networks 053.

When the operator of the master display terminal 051 desires to watch the image at region 701 more clearly, the operator inputs the request through the screen parameter request input portion 0108.

Figures 8, 9:
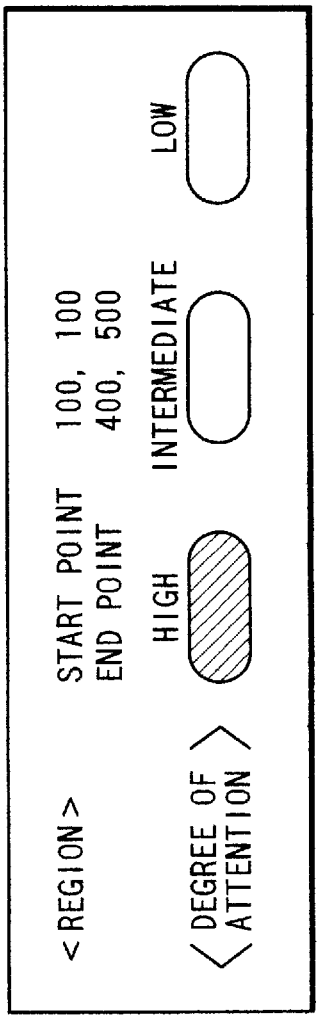
FIG. 8 is an illustration of the second embodiment showing an example image of inputting a request.
FIG. 9 is an illustration of the second embodiment showing resource data of the master and slave display terminals.

FIG. 8 is an illustration of the second embodiment showing an example image of inputting a request.

The operator of the master display terminal 051 inputs the data of the region 701 and a degree of attention. The screen parameter data generation portion 0509 receives the request from the screen parameter request input portion 0108 and receives the resource data of the concerning slave terminal 052 and the resource data of the master display terminal 051.

FIG. 9 is an illustration of the second embodiment showing resource data of the master and slave display terminals 051 and 052.

The screen parameter data generation portion 0509 determines the most suitable transmission manner and an amount of data satisfying the request in accordance with the data shown in FIG. 8 and 9 as the screen parameter data.

FIG. 10 is a diagram of the second embodiment showing a flow chart of generating the screen parameter data. At first, the screen parameter data generation portion 0509 roughly determines a network and a method of transmission of the video data commonly used in steps 0851, 0852, and 0853. In the following step 0854, if there is a remaining parameter, the screen parameter data generator 0509 determines the parameter data in step 0857. If there is a plurality of remaining parameters in step 0854, the screen parameter data generation portion 0509 ranks the parameter in accordance with transmission data rates in step 0855. In the following step 0856, the screen parameter data generation portion 05059 judges the parameters in accordance with degrees of attention. Finally, the screen parameter data generation portion 0509 determines the parameters in step 0857.

FIG. 11 is an illustration of the second embodiment showing an example of determined parameter data.

As shown in FIG. 11, the screen parameter data indicative of the region (100, 100) to (400, 500) and a coaxial cable included in the networks 053, and channel 20 of the coaxial cable is determined.

The screen parameter data generated as mentioned is transmitted through the screen parameter data transmission portion 0110 to the concerning slave display terminal 052. Then, as similar to the first embodiment, the video data of the slave display terminal 052 is transmitted to the master display terminal 051 and displayed on the display of the master display terminal 051. As the result, the whole displayed image on the display of the master display terminal 051 is renewed once per ten seconds and at the region 701 the image is displayed with an analog signal transmission.

Then, the operator further desires to watch the image at another region 702. The screen parameter data generation portion 0509 generates screen parameter data in response to the request by the operator as similar. However, the channel 20 of the coaxial cable has been used. Then, the screen parameter data generation portion 0509 generates another screen parameter data for the image of the region 702.

For example, it is assumed that moving picture compression boards A of the master display terminal 051 and the slave display terminal 052 can be used. The screen parameter data generation portion 0509 generates the screen parameter data indicative of the region (2000, 600) to (700, 800), the transmission line 10 BASE-T included in the networks 053, and the moving picture compression board A. As similar to the first embodiment, the screen parameter data is transmitted to the slave display terminal 052 and the video data at the region 702 is further transmitted to the master display terminal 051. As the result, the whole screen image is renewed once per ten seconds, the image at the region 701 is displayed with an analog signal such as NTSC composite signal, and the image at the region 702 is displayed through the digital moving picture processing with the moving picture compression board A.

As mentioned, the resource of the networks and the hardwares of the master display terminal 051 and the slave display terminal 052 can be most efficiently to provide high quality images matching to the requests.

A third embodiment will be described.

Figure 12:
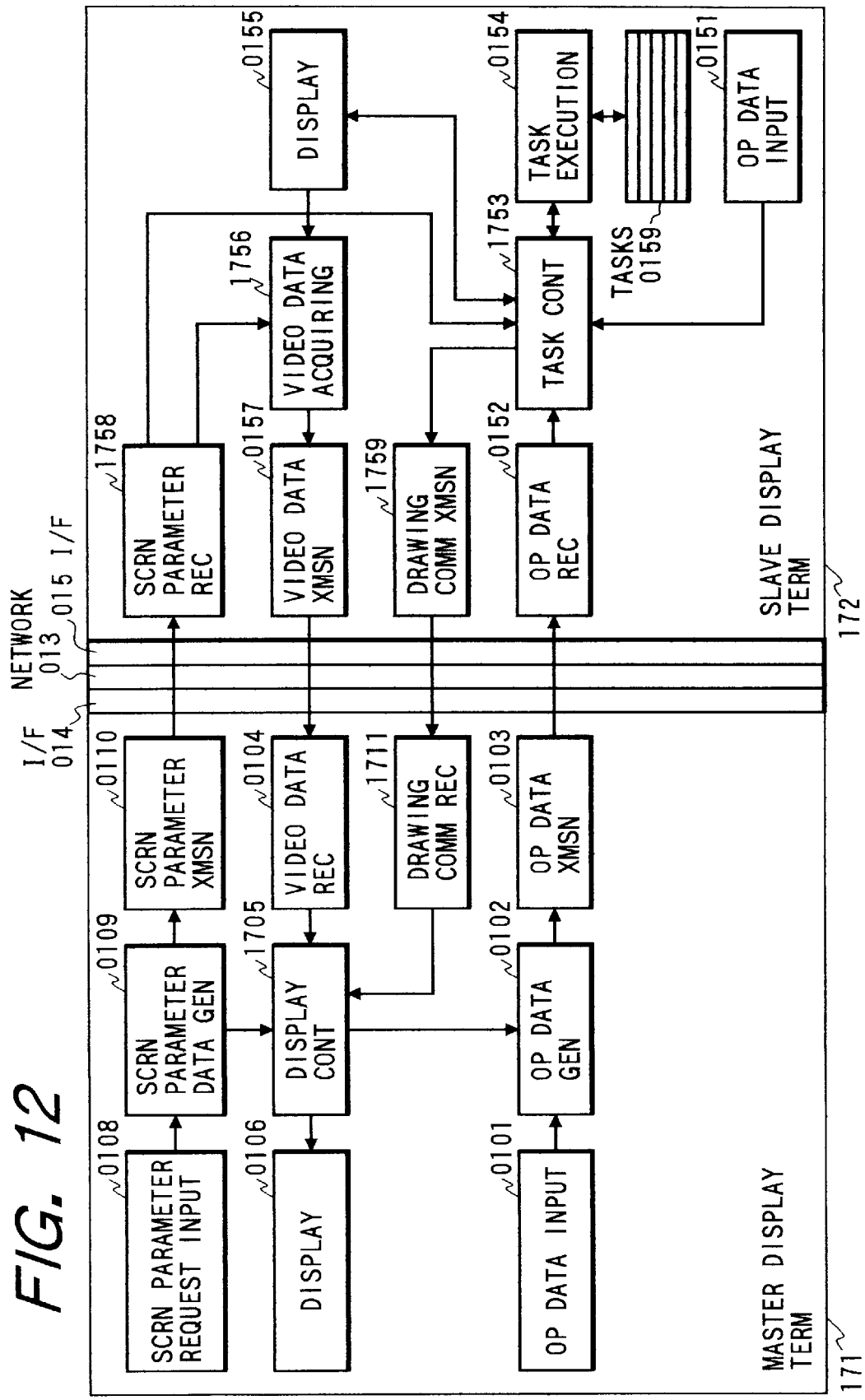
FIG. 12 is a functional block diagram of a remote operation apparatus of a third embodiment.

FIG. 12 is a functional block diagram of a remote operation apparatus of the third embodiment, wherein functions of respective blocks are provided by the programs stored in the memory 2 or 4 in cooperation with other units of the mouse 5 or 8, the keyboard 6 or 9, the display unit 7 or 10, or the interface unit 014 or 015.

A structure and an operation of the third embodiment are similar to those of the first embodiment basically. A difference between the first and third embodiments is as follows:

The screen parameter data input portion 0108 receives a second request indicative of requiring to transmit the drawing command via the screen parameter data generation portion 0109, the screen parameter transmission portion 0110 and the screen parameter receiving portion 1758 to the task operation portion 1753.

The slave display terminal 172 further comprises a drawing command transmission portion 1759 for transmitting the drawing command from the task operation portion. The master display terminal 171 further comprises a drawing command receiving portion 1711 for receiving the drawing command from the drawing command transmission portion 1759.

The task control portion 1753 transmits the drawing command to the display control portion 1705 in response to the second request. The display control portion 1705 further responses to the drawing command from the task operation portion during operating the display portion.

An operation of the third embodiment will be described.

As mentioned above, the basic operation is similar to the first embodiment. Thus, an operation from the input of the second request for requesting to transmit the drawing command in the screen parameter request input portion 0108 to reception of the drawing command in the master display terminal 171 is mainly described. Moreover, it is assumed that the screen image of the slave display terminal 172 has been displayed on the display of the master display terminal 171.

When the second request for requesting to transmit the drawing command is inputted into the screen parameter request input portion 0108 as the screen parameter, the second request is transmitted to the task control portion 1753 via the screen parameter data generation portion 0109, the screen parameter transmission portion 0110, and the screen parameter receiving portion 1758. The second request for transmitting the drawing command includes coordinate position data to identify the corresponding task.

In the slave display terminal 172, the task control portion 1753 receives the second request for transmitting the drawing command from the screen parameter receiving portion 1758 and detects the concerning task. In this embodiment, the coordinate position data is transmitted to identify the concerning task and the task control portion 1753 detects the concerning task generating the displayed image within which the coordinate position data exists.

The task control portion 1753 acquires the drawing command from the detected task and transmits it to the display portion 0155 and to the drawing command transmission portion 1759. The drawing command transmission portion 1759 transmits the received drawing command to the master display terminal 171. The drawing command receiving portion 1711 receives the transmitted drawing command and sends to the display control portion 1705.

The display control portion 1705 may change the coordinate positions if the change is necessary and sends the drawing command to the display 0106. As the result, the displaying on the display on the master display terminal 171 is effected using the drawing command from the task which is indicated by the master display terminal 171.

As mentioned, by the drawing command, the operator of the master display terminal 171 can display the image to which the operator gives attention. Thus, the displayed image on the display of the master display terminal 171 can be made by transmitting the video data of the display of the slave display terminal 172 to the master display terminal 171 and by transmitting the display command originally provided to displaying in the slave display terminal 172 to the master display terminal 171, so that processing of the video data can be simplified and the capacities of memories and the networks can be used efficiently.

A fourth embodiment will be described.

Figure 13:
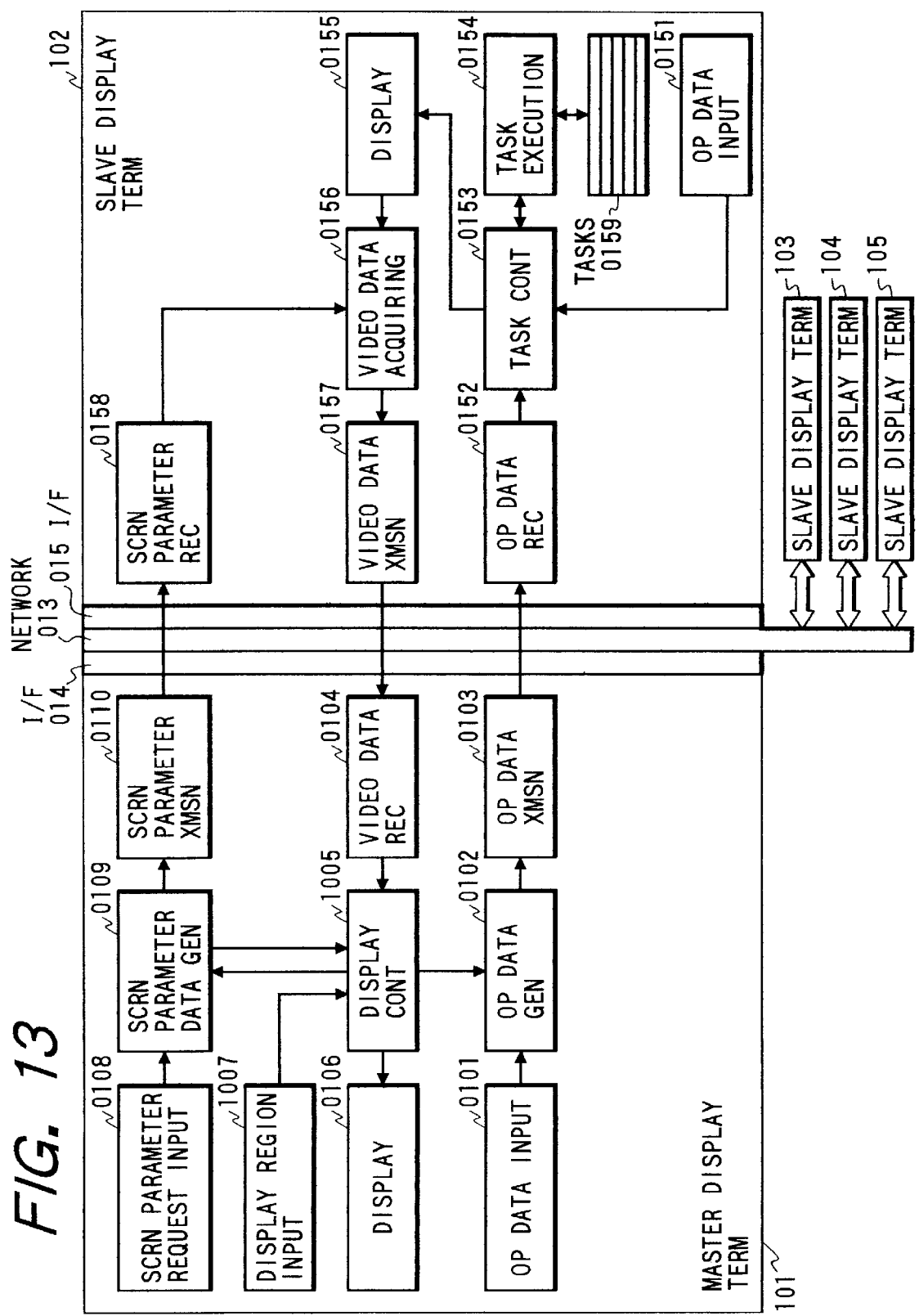
FIG. 13 is a functional block diagram of a remote operation apparatus of a fourth embodiment.
Figure 14:
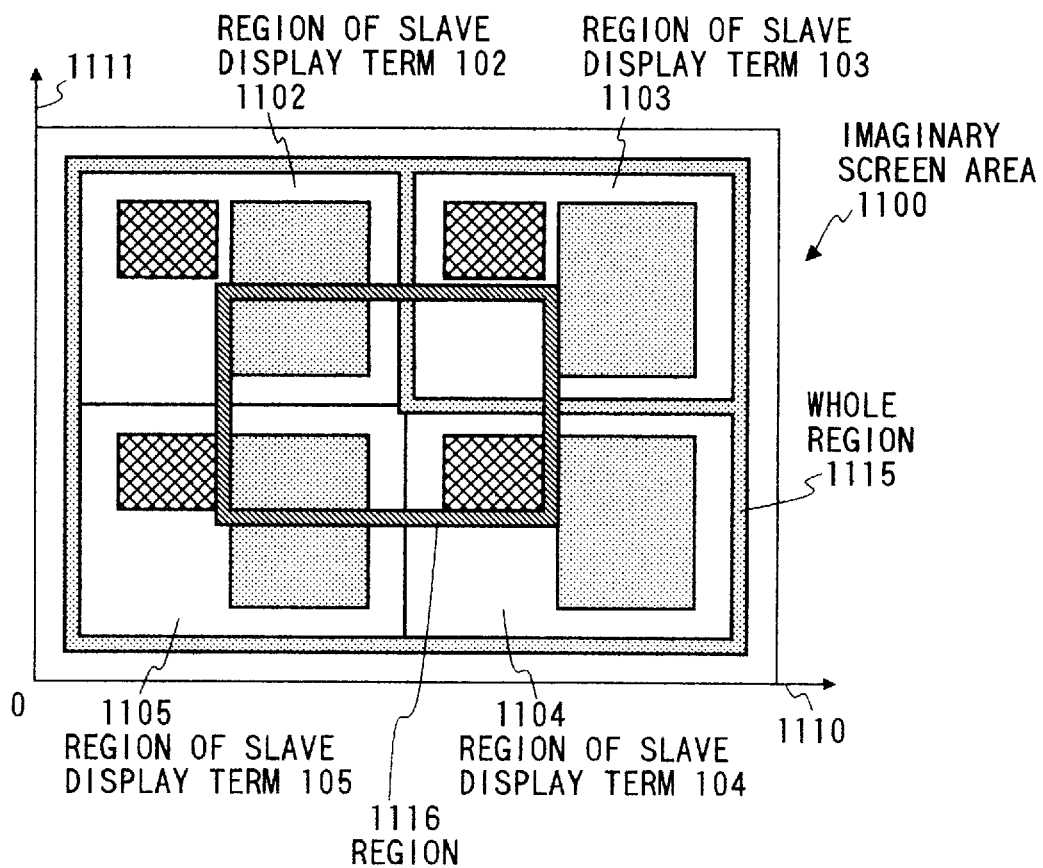
FIG. 14 is an illustration of an imaginary screen of the fourth embodiment.
Figure 15:
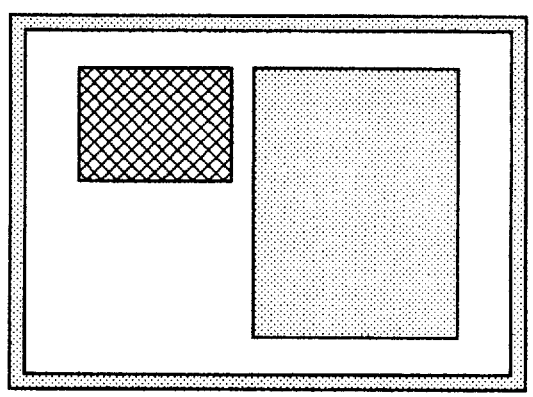
FIG. 15 is an illustration of a transmitted image in the remote control apparatus of the fourth embodiment.

FIG. 13 is a functional block diagram of a remote operation apparatus of the fourth embodiment, wherein functions of respective blocks are provided by the programs stored in the memory 2 or 4 in cooperation with other units of the mouse 5 or 8, the keyboard 6 or 9, the display unit 7 or 10, or the interface unit 014 or 015. FIG. 14 is an illustration of an imaginary screen of the fourth embodiment. FIG. 15 is an illustration of a transmitted image in the remote control apparatus of the fourth embodiment.

A structure and an operation of the fourth embodiment are similar to those of the first embodiment basically. A difference between the first and fourth embodiments is as follows:

The master display terminal 101 and first to fourth slave display terminals 102 to 105 coupled each other through the network 013. The display control portion 1005 stores positional data of screen areas 1102–1105 of the first to fourth slave display terminals 102–105 such that the screen areas 1102–1105 form an imaginary screen area 1100 having horizontal and vertical coordinates 1110 and 1111. Each of the screen areas of slave display terminals 102 to 105 are uniquely represented by the positional data on the horizontal and vertical coordinates 1110 and 1111.

Moreover, the master display terminal 101 further comprises: a display region input portion 1007 for inputting and supplying a display request including the positional data on the horizontal and vertical coordinates 1110 and 1111 indicative of a region at the screen areas of the first to fourth slave display terminals 102 to 105 to the display control portion 1005. The display control portion 1005 operates the screen parameter data generation portion 1009 to generate the screen parameter data in accordance with the display request so as to operate one of the first to fourth slave display terminals 102 to 105, for example, the first slave display terminal to transmit the video data of an image at the region of the first slave display terminal 102 to the master display terminal 101 or the other slave display terminal 103–105.

More specifically, for example, there are first and second slave video terminals 102 and 103 to which first and second addresses assigned respectively. The display control portion 1005 stores positional data of screen areas 1102 and 1103 of the first and second slave display terminals 102 and 103 such that these screen areas 1102 and 1103 form the imaginary screen area 1100 having coordinates 1110 and 1111. Each of the screen areas being uniquely represented by the positional data on the coordinates. The the master video terminal 101 further comprises: the display region input portion 1007 for inputting and supplying the display request including positional data on the coordinates 1110 and 1111 indicative of a region at the screen area 1102 of the first slave display terminal 102 to the display control portion 1005. The display control portion 1005 judges which of the first and second address data corresponds to the region by comparing the positional data inputted from the display region input portion 1007 with the positional data of screen areas 1102 and 1103 and converts the positional data of the region to the positional data for the screen parameter data generation portion 1009 and operates the screen parameter data generation portion 1009 to generate the screen parameter data in accordance with the display request so as to operate one of the first and second slave display terminals 102 and 103 to transmit the first video data of an image at the region of one of the first and second slave display terminals which is selected in accordance with the judged address, to the master display terminal 101.

As mentioned, the difference between the first and fourth embodiments is in that the display control portion 1005 manages the screen areas of the slave display terminals 102 to 105 with the imaginary screen area 1100 and the display region input portion 1007 receives the display request indicative of a region of one of the slave display terminals 102 to 105. The screen parameter data generation portion 1009 utilizes the positional data indicative of the screen areas 1102 to 1105 while the screen parameter data generation portion 1009 generates the screen parameters.

An operation will be described assuming that there are the master slave display terminal 101 and the first to fourth slave display terminals 102 to 105 coupled each other through the network 013. The operation will be mainly described with respect to the difference between the first and fourth embodiments.

As shown in FIG. 14, the imaginary screen includes the screen areas 1102–1105 of the first to the fourth slave display terminals 102 to 105. That is, the display control portion 1005 in the master display terminal 101 holds positional data of the screen areas of the first to fourth slave display terminals 102 to 105 to utilize the positional data for commanding to transmit the video data at a region of one of screen areas 1102 to 1105 of the corresponding slave display terminal.

The regions 1102 to 1105 for screen areas of the slave display terminals 102 to 105 closely arranged in a matrix which is larger than a total area of the screen areas of the slave display terminals 102 to 105.

FIG. 14 shows respective screen areas. However, the display control portion 1005 only stores the positional data on the vertical and horizontal coordinates 1110 and 1111. Therefore, it is also possible that the screen areas of the slave display terminals 102 to 105 are arranged in a shape other than a this form.

If the operator of the master display terminal 101 desires to display the image on the slave display terminal 103 on the display 0106 of the master display terminal 101, the operator inputs the display region data of the region 1103 by the display region input portion 1007. The display control portion 1005 receives the display positional data and store the positional data on the horizontal and vertical coordinates 1110 and 1111 and operates the screen parameter generation portion 1009 to generate the screen parameter corresponding to the region 1103. It is assumed that the video data of a whole of the screen area of the slave display terminal 102 is transmitted.

The generated screen parameter is transmitted to the slave display terminal 103. As similar to the first embodiment, the video data of the screen area 1103 of the slave display terminal 103 is transmitted to and displayed on the master display terminal 101 as shown in FIG. 15.

The display control portion 1005 sends the positional data to the operational data generation portion 1102 as similar to the first embodiment. In addition, the display control portion 1005 adds data of one of the slave terminal to be operated to the positional data. Thus, when the operator inputs operational data, the operational data generation portion 0102 generates the operational data to the concerning slave terminal, so that the task of the concerning slave display terminal can be operated from the master display terminal.

Figures 16, 17:
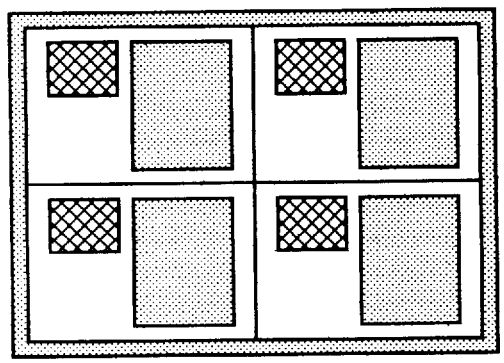
FIG. 16 is an illustration of data for remote operation of the fourth embodiment.
FIG. 17 is an illustration of an image on the master display terminal of the fourth embodiment.

An operation in the case where the operator tries to display video data from four slave display terminals 102 to 105 at the same time in this condition will be described. FIG. 16 is an illustration of data for remote operation of the fourth embodiment. FIG. 17 is an illustration of an image on the master display terminal of the fourth embodiment.

As mentioned above, the operator inputs the positional data of a whole region 1115 by the display region input portion 1007. The display control portion 1005 calculates regions and contraction scales on the display of the master display terminal 101 to the screen areas 1102 to 1105. As the result, the display control portion 1005 obtains each of contraction scales, one fourth. Then, the display control portion 1005 commands the screen parameter data generation portion 1009 to generates the scree parameters as shown in FIG. 16. The screen parameter data generation portion 1009 receives the command from the display control portion 1005 to generate the screen parameters and generates screen parameter data for respective slave display terminals 102 to 105 and transmits sets of the screen parameter data to the slave display terminals 102 to 105 respectively. Thus, the slave display terminals 102 to 105 receive the screen parameter data and transmit the video data of the whole screen areas 1102 to 1105 to the master display terminal 101 respectively. As the result, the master display terminal 101 receives the video data of the whole screen areas 1102 to 1105 of respective slave display terminals and displays the video data on the display of the master display terminal 101 as shown in FIG. 17, wherein respective images from the slave display terminals 102 to 105 at a contraction scale of one fourth and occupies the whole screen area 1115 of the display of the master display terminal 101. In addition to this, as mentioned above, the display control portion 1005 can operate a task in one of slave display terminals 102 to 105, which are being executed, by transmitting the positional data to the operational data generation portion 1002.

Figures 18, 19:
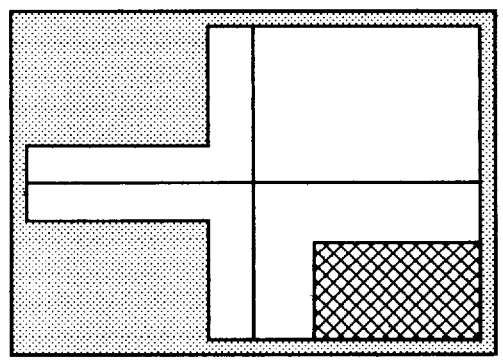
FIG. 18 is an illustration of data of the fourth embodiment.
FIG. 19 is an illustration of an example of a displayed image of the fourth embodiment.

Then, an operation in the case where the operator of the master display terminal 101 inputs the data of the display region of the region 1116 by the display region input portion 1007 will be described. FIG. 18 is an illustration of data of the fourth embodiment. FIG. 19 is an illustration of an example of a displayed image of the fourth embodiment.

The display control portion 1005 calculates the display regions and contraction scales of the respective slave display terminals 102 to 105. Then, the display control portion 1005 commands the screen parameter data generation portion 1005 to generate the screen parameter data as shown in FIG. 18. In response to this, the screen parameter data generation portion 1009 generates and sets of screen parameter data for respective slave display terminals 102 to 105 and transmits them to respective slave display terminals 102 to 105. Then, as similar to the first embodiment, the video data of screen areas of respective slave display terminals 102 to 105 are transmitted in accordance with the sets of the screen parameter data and the video data of respective slave terminals 102 to 105 are combined and displayed on the display of the master display terminal 101 as shown in FIG. 19.

In this condition, the video data not displayed on the display 0106 of the master display terminal 101 is not transmitted, so that loads on the network 013 and the master display terminals are reduced.

As mentioned above, according to the fourth embodiment, when a plurality of slave display terminals 102 to 105 are coupled to the master display terminal 101, the operator can display only the desired area with a suitable size and the video data of only the commanded areas are transmitted, so that loads of the network 013 and the master display terminal is reduced.

Figure 20:
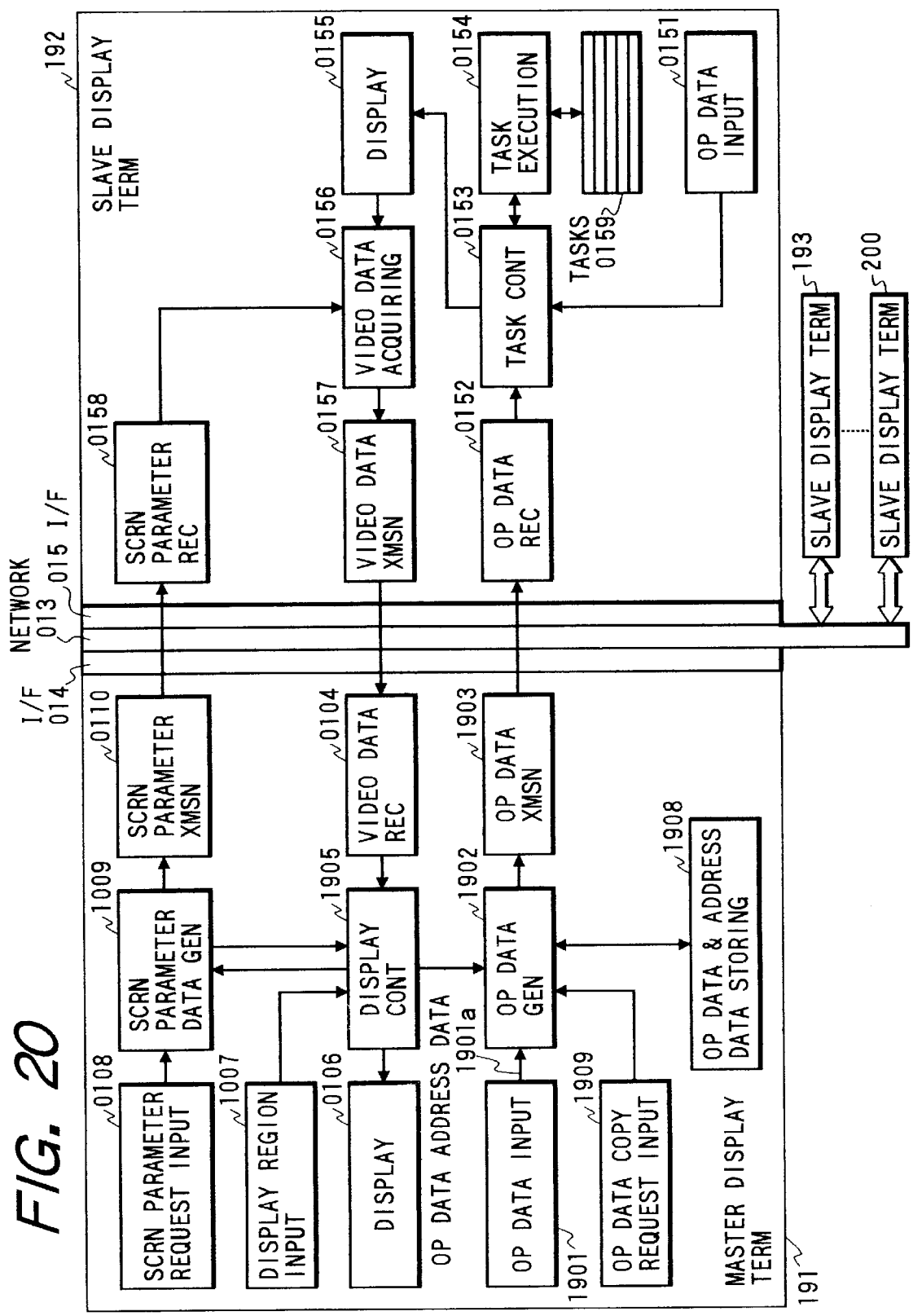
FIG. 20 is a functional block diagram of a remote operation apparatus of a fifth embodiment.

A fifth embodiment will be described. FIG. 20 is a functional block diagram of a remote operation apparatus of the fifth embodiment, wherein functions of respective blocks are provided by the programs stored in the memory 2 or 4 in cooperation with other units of the mouse 5 or 8, the keyboard 6 or 9, the display unit 7 or 10, or the interface unit 014 or 015. The remote operation apparatus of the fifth embodiment is used for remote education system for example. That is, a teacher lectures the student remote from the teacher using the remote operation apparatus of the fifth embodiment. For example, the teacher transmits a problem to the students and the students transmit solutions to the teacher. The teacher watches the condition of received solutions and instructs the students through the remote operation apparatus.

A structure and an operation of the fourth embodiment are similar to those of the fourth embodiment basically. A difference between the fourth and fifth embodiments is as follows:

The first operational data input portion 1901 further receives first address data of one of the slave display terminals 192 to 195 and the operational data generation portion 1902 generates the first operational data with the address data. The master display terminal 191 further comprises an operational data and address data storing portion 1908 for correspondingly storing the first operational data and the first address data, an operational data copy request input portion 1909 for receiving an operation data copy request. The operational data generation portion 1902 generates duplicated operational data by duplicating the first operational data and generates second address data of one or more of the slave display terminals. The operation data transmission portion 0103 transmits the second operational data to the slave display terminals in accordance with the second address data to copy the image on the slave display terminal having the first address data on the displays of one or more of the slave display terminals.

As mentioned, when an operational data copy request is inputted to the operational data request input portion 1901 in the master display terminal 191, i.e., a teacher's terminal, the operation data generator 1902 reads the stored operational data and address data in the operation data and address data storing portion 1908 and duplicates the operational data with positional data of the first salve display terminal 192 converted into the positional data of the second slave display terminal 193 and generates the second address data of the second slave display terminal 193 to transmit the duplicated operational data to the slave display terminal 193 , i.e., the student's display terminal having the second address data.

Figure 21B:
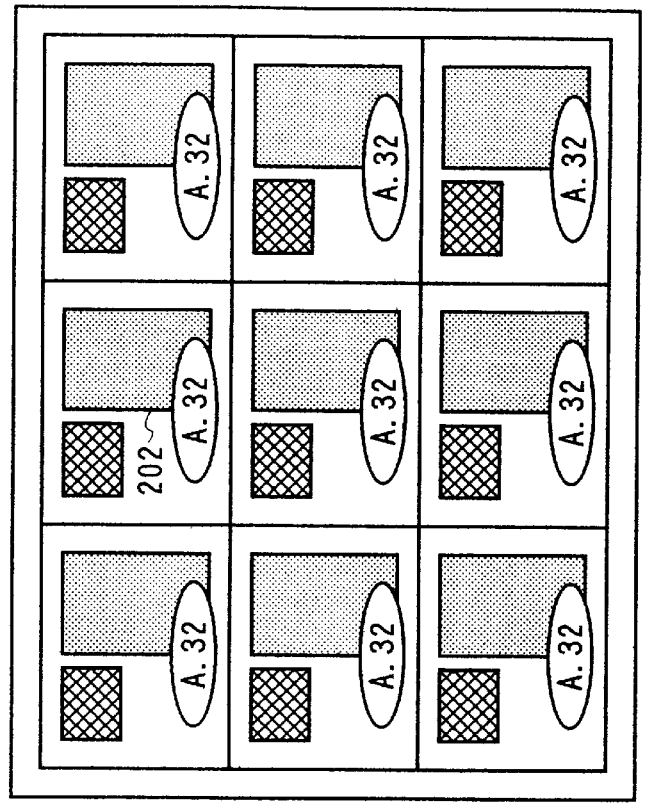
FIGS. 21A and 21B are illustrations of displayed images of the fifth embodiment.
Figure 21A:
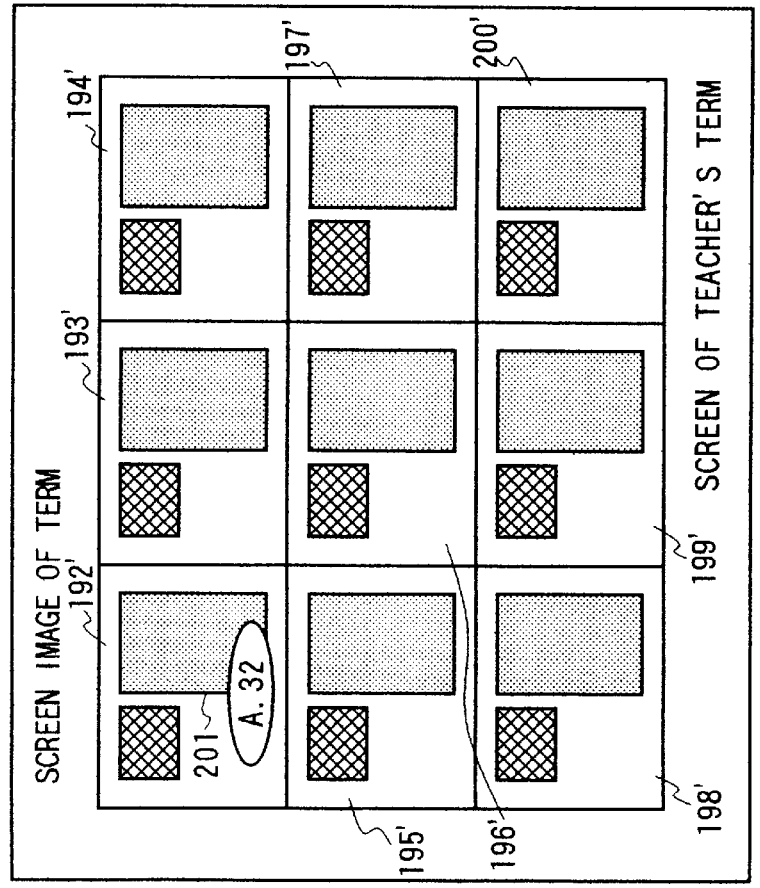

An example of operation will be described. FIGS. 21A and 21B are illustrations of displayed image of the fifth embodiment. In this example, it is assumed that the remote operation apparatus includes one teacher's terminal master display terminal) 191 and first to ninth student's terminals (slave display terminals) 192 to 200 and the operation will be mainly described about the difference between the fourth and fifth embodiments. Thus, the display 0106 of the teacher's terminal 191 displays an image as shown in FIG. 21A. That is, the screen images 191' to 200' of student's terminals 192 to 200 are displayed with the screen images arranged in a matrix. Moreover, in respective student's terminals 192 to 200, the same tasks are being operated and the relative display portions are the same. Then, the teacher effects a copy operation as follows:

For example, if the teacher sends an image including a caution or an answer to the problem to the student's terminal 192 of one student, the teacher may desire to transmits the same image to the other students. In that case, the teacher inputs operation data copy request by the operational data copy request input portion 1909. Thus, the teacher inputs address data of the student's terminals 193 to 200 by the operational data copy request input portion 1909. The operational data copy request input 1909 sends the copy request with the address data to the operational data generation portion 1902. Then, the operational data generation portion 1902 enters the copy mode and stores the address data of other student's terminals 193 to 200 in the operation data and address data storing portion 1908. After this operation, when the teacher inputs the first operational data by the operational data input portion 1901 directing the student's terminal 192, the first operational data is transmitted to the student's terminal 192 and is stored in the operational data and address data storing portion 1908.

Then, the operational data generation portion 1902 reads the first operational data and the address data of the other student's terminals 193 to 200 and converts the positional data included in the first operational data into positional data for each of other student's terminals 193 to 200. Then, each set of operational data including the converted positional data is transmitted to each of other student's terminals 193 to 200 using the stored address data of other student's terminals 193 to 200.

In this operation, the duplication of the first operational data can be effected after the operational data generation portion 1902 enters the copy mode. However, a modification is provided as follows:

The operational data and address data storing portion 1908 always stores the first operational data without address data successively irrespective of the copy mode within a predetermined amount of the first operational data, so that the copy operation is effective to the first operational data inputted before the copy mode. In that case, the address data is inputted after confirmation of a set of the first operational data read from the operational data and address data storing portion 1908 in the copy mode.

In this embodiment, it was assumed that images on respective student's terminals are the same. However, if the images on the respective student's terminals are different, with the structure of the fifth embodiment, it is possible to make positions of images the same between the respective student's terminals. Moreover, if the display positions of images on the respective student's terminals are different, the copy operation can be provided by providing the first operational data with the positional data converted every respective student's terminals.

Moreover, the copy operation is effected in the condition that the displayed image on the teacher's terminal 191 includes images of all student's terminals. However, this copy operation is also possible if the teacher's terminal displays the image only from the student's terminal 192.

As mentioned above, the operational data copy request is inputted by the operational data copy request input portion 1909 and the operational data generation portion 1902 generates the first operational data which is not inputted by the operational data input portion 1901 using the operational data stored in the operational data and address data storing portion 1908 and the generated first operational data is transmitted, so that the teacher can provide the same image to student's terminals other than the student's terminal to which the teacher provided the image. Therefore, the teacher can omit the repeatedly inputting the first operational data directing to other student's terminal 193 to 200.

Figure 22A:
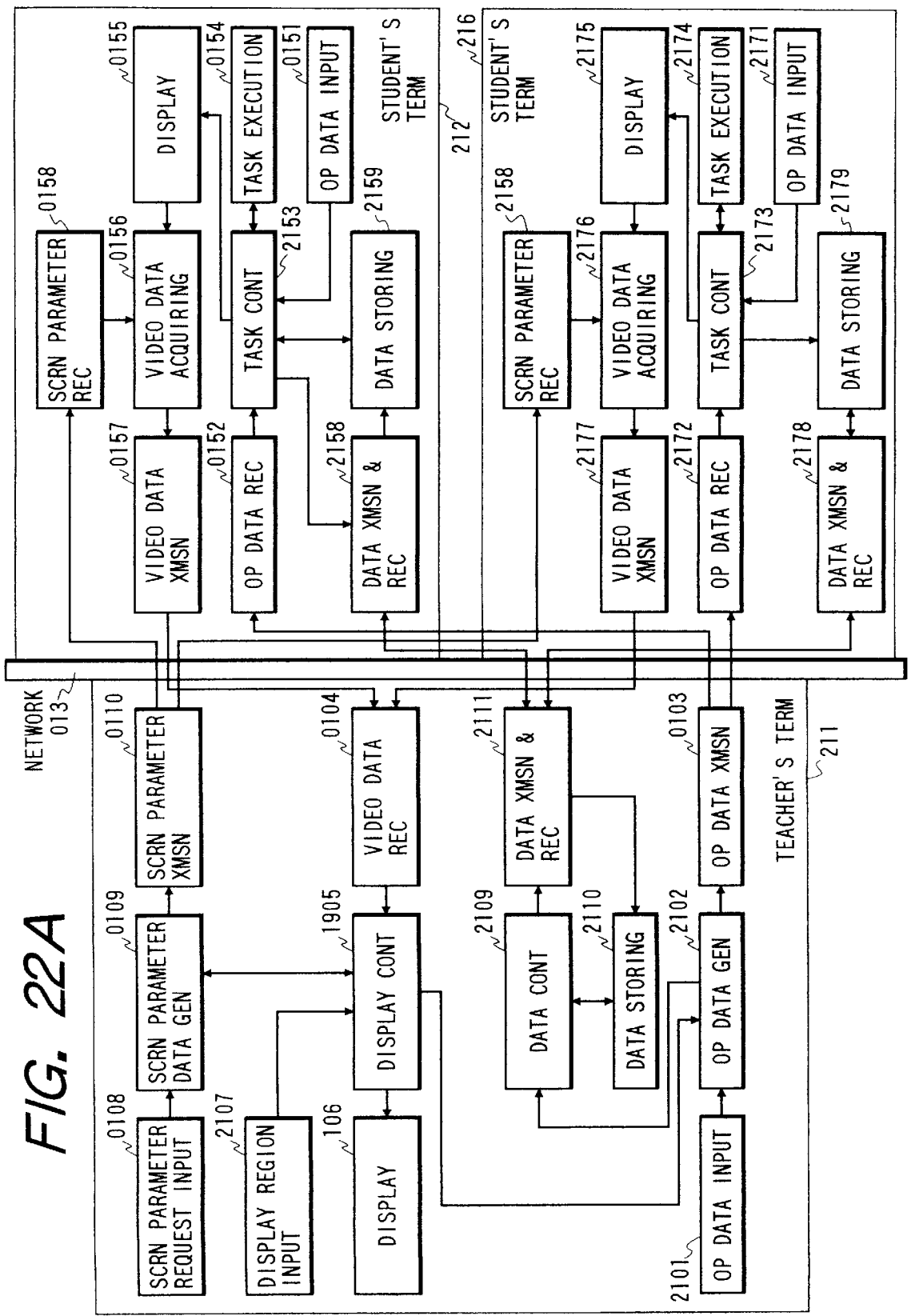
FIG. 22A is a functional block diagram of a remote operation apparatus of a sixth embodiment.
Figure 23B:
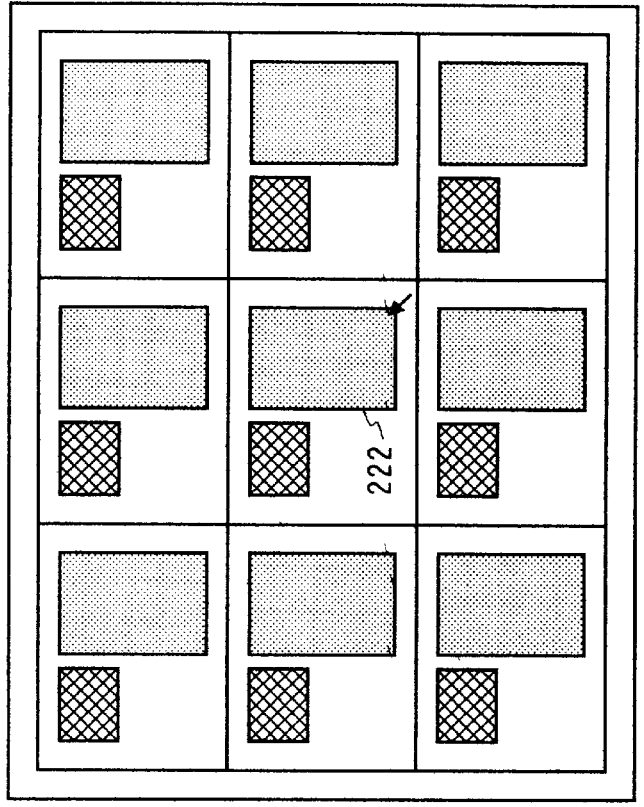
FIGS. 23A and 23B are illustrations of displayed image of the sixth embodiment.
Figure 23A:
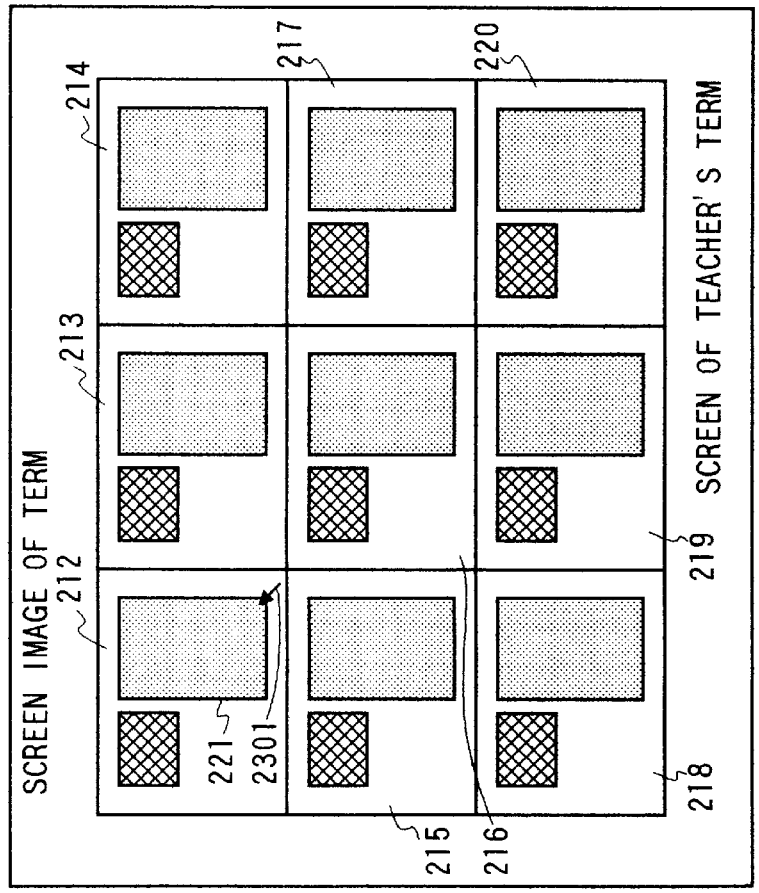
Figure 24:
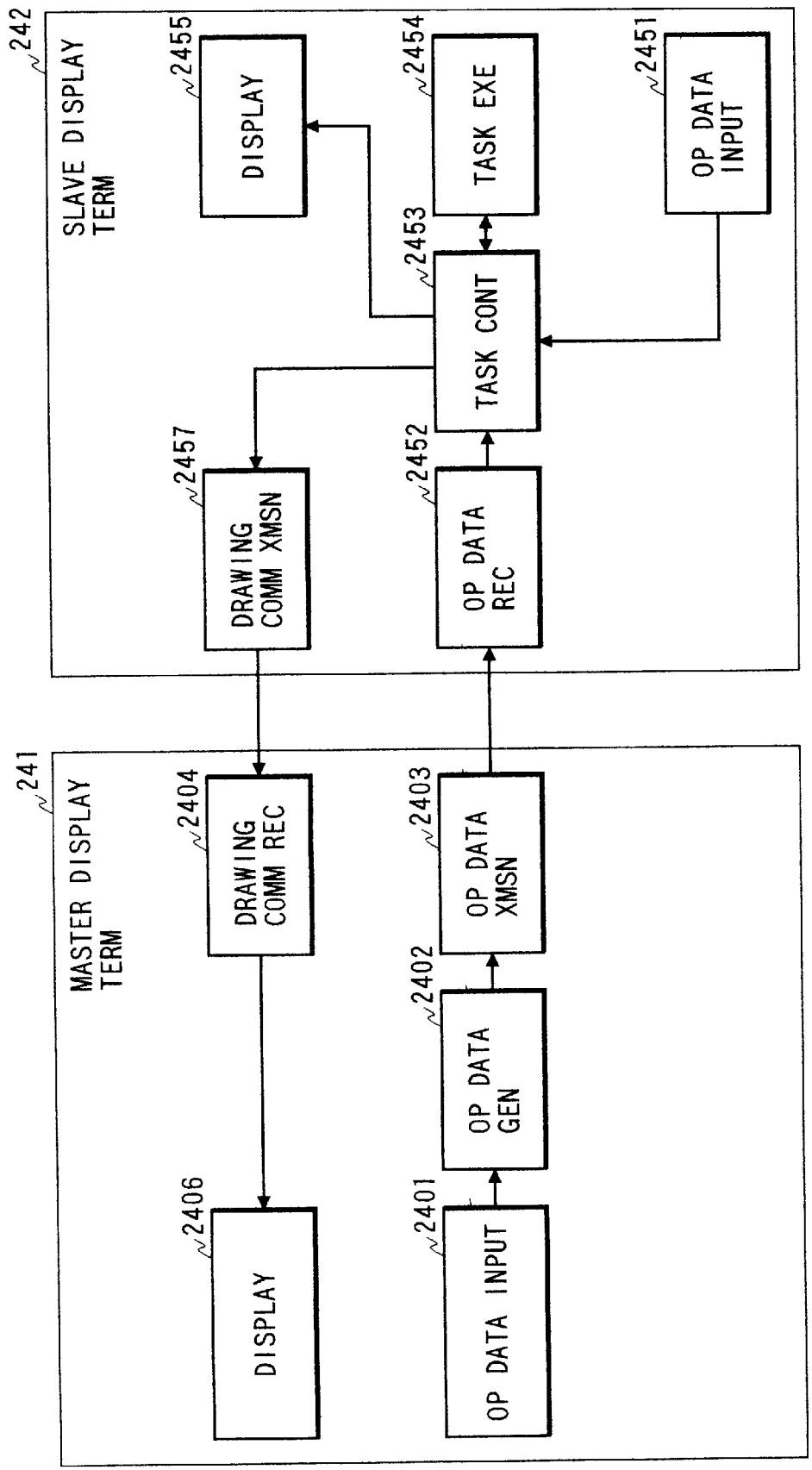
FIG. 24 is a block diagram of the first type of a prior art remote operation apparatus.
Figure 25:
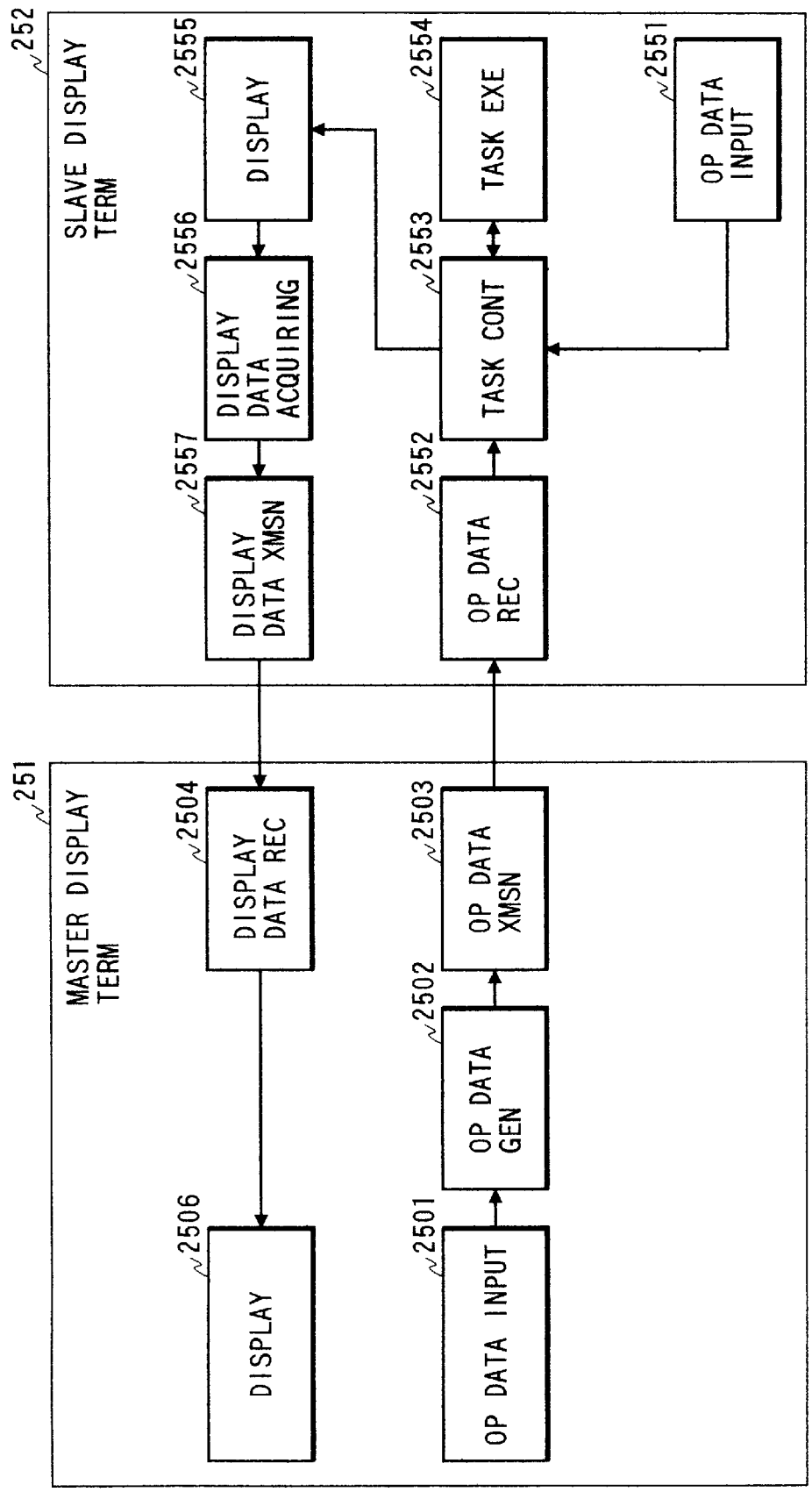
FIG. 25 is a block diagram of the second type of a prior art remote operation apparatus.

A sixth embodiment will be described. FIG. 22A is a functional block diagram of a remote operation apparatus of the sixth embodiment, wherein functions of respective blocks are provided by the programs stored in the memory 2 or 4 in cooperation with other units of the mouse 5 or 8, the keyboard 6 or 9, the display unit 7 or 10, or the interface unit 014 or 015 which is omitted in FIG. 22A for convenience of illustration. FIGS. 23A and 23B are illustrations of displayed image of the sixth embodiment. The remote operation apparatus of the sixth embodiment is used for remote education system for example. That is, a teacher lectures the student remote from the teacher using the remote operation apparatus of the sixth embodiment. For example, the teacher transmits a problem to the students and the students transmit solutions to the teacher. The teacher watches the condition of received solutions and instructs the students through the remote operation apparatus. In this embodiment, the teacher can copy data (image data) in one student's terminal used for displaying and transmit copied data to another student's terminal.

A structure and an operation of the sixth embodiment are similar to those of the fourth embodiment basically. A difference between the fourth and sixth embodiments is as follows:

First and second address data are assigned to first and second slave video terminals 212, 216. The first operational data input portion 2101 further receives the first address data and a data transmission request. The operational data generation portion 2102 generates the first operational data indicative of the data transmission request with the first address data. The master display terminal (teacher's terminal) 211 further comprises a data control portion 2109, a first data transmission and receiving portion 2111, and a first data storing portion 2110. The operational data generation portion 2102 generates the first operational data indicative of the data transmission request. The operational data transmission portion 0103 transmits the first operational data indicative of the data transmission request to the task operation portion 2153 via the operation data receiving portion 0152 of the first slave display (student's) terminal 212 using the first address data. The first and second slave display terminals 212, 216 further include second and third data storing portions 2159 and 2179 and second and third data transmission and receiving portions 2158, 2178 respectively. The task operation portion 2153 of the first slave display terminal 212 operates one of the plurality of tasks corresponding the first operational data indicative of the data transmission request to generate data, stores the data in the second data storing portion 2159 of the first display terminal 212, and operates the data transmission and receiving portion 2158 of the first display terminal 212 to transmit the data to the data transmission and receiving portion 2111 of the master display terminal 211. The first data storing portion 2110 stores the data from the data transmission and receiving portion 2158. The operational data input portion 2101 further receives the second address data and the first operational data indicative of a data pasting request. In response to the first operational data indicative of the data pasting request, the operational data generation portion 2102 generates the first operational data indicative of the data pasting request. In response to the pasting request, the operational data generation portion 2102 generates the first operational data indicative of the data pasting request. The data control portion 2109 reads the data in the first data storing portion 2110 and transmits the data from the first data storing portion 2110 to the second data transmission and receiving portion 2178 of the second slave display terminal 216. The second data storing portion 2179 of the second slave display terminal 216 stores the data from the data transmission and receiving portion 2178 of the second display terminal 216 to supply the data in the second data storing portion of the second slave display terminal to the task control portion 2173 of the second slave display terminal 216.

As mentioned, the difference between the fourth and sixth embodiment in that the teacher's terminal further includes the data transmission and receiving portion 2111 for transmitting and receiving data displayed on the display of one of the student's terminals (slave display terminals), the data control portion 2109 for controlling the data, the first data storing portion 2110 and the student's terminals 212 to 220 further include the second and third data storing portions 2159 and 2179 and the second and third data transmission and receiving portions 2158 and 2178.

A modification of the sixth embodiment will be described. FIG. 22B is a functional block diagram of a modification of the remote operation apparatus. In this modification, an operation region control portion 2112 is further provided. The operation region control portion 2112 receives copy and pasting requests and sends it to the data control portion 2109. In addition to this, the operation region control portion 2112 receives operation region data from the operation data input 2101. That is, the operation data input portion 2101 further receives the operation region data indicative of a region to be operated from the mouse 5 or the keyboard 6. The operation region control portion always detects the region to be operated which is indicated by the arrow 2301. In response to the copy request, the operation region control portion 2112 supplies the the operation region data together with the copy and request sends the copy request to the data control portion 2109 and an address of one of the slave terminals to be operated from the data of screen arrangement of slave display terminals 192-200 and the operation region data. In response to the copy request, the operation region control portion 2112 generates the copy request having address data indicative of one of the slave display terminal 212 and transmits the copy request of the slave display terminal 212. Then, the slave display terminal 212 transmits the video data to the teacher's terminal 211. The teacher's terminal 211 stores the video data in the data storing portion 2110. Then, the operation region control portion 2112 judges whether or not there is a change in the region to be operated (the arrow 2301) from the operation region data and the display position data from the display control portion 1905. If the operation region control portion 2112 detects the change of the region to be operated, in response to the pasting request, that the operation region control portion 2112 generates the pasting request to one of the student's terminal 216 having address corresponding to the region after the change. Then, the teacher's terminal 211 transmits the vide data in the data storing portion 2110 to the student's terminal 216. The student's terminal 216 stores the video data from the teacher's terminal 211 to display it. That is, the data control portion 2109 reads the data in the first data storing portion 2110 and transmits the data from the first data storing portion 2110 to the second data transmission and receiving portion 2178 of the second slave display terminal 216.

In this embodiment, it is assumed that the remote operation apparatus includes one teacher's terminal (master display terminal) 191 and first to ninth student's terminals (slave display terminals) 192 to 200. Thus, the display 0106 of the teacher's terminal 191 displays an image as shown in FIG. 23A. That is, the screen images of student's terminals 192 to 200 are displayed with the nine screen images arranged in a matrix. Moreover, in respective student's terminals 192 to 200, the same tasks are being operated and the relative display portions are the same. Then, the teacher effects a data copy operation that is, the teacher copies the screen image of the student's terminal 212 on the display of the student's terminal 216 as follows:

As shown in FIG. 23A, the teacher operates the keyboard 6 or the mouse 5 while an arrow 2301 controlled by the mouse is displayed on the screen image of the student's terminal 212. That is, the teacher operates the operational data input portion 2101 to input the copy request. Then, the task control portion 2153 stores the data corresponding to the data transmission request and transmits it to the data transmission and receiving portion 2111 of the teacher's terminal 211. The data control portion 2109 of the teacher's terminal 211 stores the data in the first storing portion 2110.

Then, the teacher operates the keyboard 6 or the mouse 5 to input the data pasting request. Then, the teacher operates the operational data input portion 2101 to input the data pasting request. That is, the teacher operates the mouse and the arrow 2301 crosses the screen image of the terminal 213 as shown in FIG. 23A. Then, the data pasting request is inputted to the operational data generation portion 2102. The operational data generation portion sends the first operational data indicative of the data pasting request to the data control portion 2109 with the address data of the student's terminal 213. The data control portion 2109 reads the data in the data storing portion 2110 and transmits the data to the task control portion of the student's terminal 213. Then, the teacher further operates the mouse to move the arrow 2301 to the screen image of the student's terminal 216, the data control portion 219 transmits the task control portion 2173 of the student's terminal 216 to display the data.

In this embodiment, the copy and pasting operation is described. However, other similar operation can be provided by this structure such as the cut and paste operation or the drag and drop operation.

As mentioned above, according to the sixth embodiment, in the teacher's terminal 211, the copy and past operation is provided by transmitting the data used for displaying.

What is claimed is:

1. A remote operation apparatus comprising a master display terminal and at least a slave display terminal, coupled to said master terminal through at least a network, to be remote controlled by said master display terminal, said master display terminal including:

a video data receiving portion for receiving first video data from said slave display terminal;

a first display portion, having a first display;

a display control portion for operating said first display portion to display a first image in accordance with said first video data with positions of said first image controlled in accordance with first positional data;

a screen parameter data input portion for inputting a request;

a screen parameter data generation portion responsive to said inputted request for generating screen parameter data including said first positional data;

a screen parameter transmission portion for transmitting said screen parameter data to said a slave display terminal;

a first operational data input portion for receiving first operational data input;

an operational data generation portion for generating first operational data in accordance with said first operational data input and converting said first positional data to second positional data; and an operational data transmission portion for transmitting said first operational data and second positional data to said slave display terminal, said slave display terminal including:

an operational data receiving portion for receiving said first operation data and said second positional data from said operational data transmission portion through said at least network;

a second operational data input portion for inputting second operational data including position data;

a task operation portion including a plurality of tasks and a task detection portion, wherein said task detection portion detects one of said plurality of tasks corresponding to said first operational data and said received second positional data and said task operation portion supplying said first operational data and said second positional data from said operational data receiving portion to the detected one of said plurality of tasks to operate it to generate a first drawing command using said second positional data when said operational data receiving portion receives said first operation data and said second positional data, said task detection portion detects one of said plurality of tasks corresponding to said second operational data and said received position data and said task operation portion supplying said second operational data and position data from said second operational data input portion to the detected one of said plurality of tasks corresponding to said second operational data and said position data to operate it to generate a second drawing commands when said second operational data input portion receives said second operational data and said position data, a second display portion, having a second display, for generating second video data in accordance with said first and second drawing commands to display a second image on said second display;

a screen parameter receiving portion for receiving said screen parameter data from said screen parameter transmission portion;

a screen data acquisition portion for generating said first video data from said second video data from said second display portion in accordance with said screen parameter data from said screen parameter receiving portion; and a video data transmission portion for transmitting said first video data from said video data acquisition portion to said video data receiving portion.

2. A remote operation apparatus as claimed in claim 1, wherein said video data transmission portion has a plurality of transmission modes for transmitting said video data, said slave display terminal further comprises a resource video data control portion for holding and controlling resource data indicative of said transmission modes and a resource video data transmission portion for transmitting said resource data to said master display terminal, and said master display terminal further comprises a resource data receiving portion for receiving said resource data from said resource data transmission portion and a second resource data control portion for holding said resource data from said resource data receiving portion and generate resource control data, and said screen parameter data generation portion generates said screen parameter data in accordance with said resource control data in addition to said request.

3. A remote operation apparatus as claimed in claim 1, wherein said screen parameter data input portion further receives a second request indicative of requiring said first and second drawing commands and said screen parameter data generation portion generates said screen parameter data indicative of said second request, said screen parameter transmission portion transmits said screen parameter indicative of said second request via the screen parameter receiving portion to the task operation portion, said slave display terminal further, comprises a drawing command transmission portion, said task operation portion transmits said first and second drawing commands to said master display terminal in response to said parameter data indicative of said second request from said screen parameter transmission portion, said master display terminal further comprises a drawing command receiving portion for receiving said first and second drawing commands from said drawing command transmission portion, and said display control portion further responses to said first and second drawing commands from said drawing command receiving portion during operating said first display portion.

4. A remote operation apparatus as claimed in claim 1, wherein said at least a slave display terminal comprises first and second slave video terminals, said master display terminal further comprises operational data storing portion for storing said first operational data and an operational data copy request input portion for receiving an operational data copy request, said operational data generation portion generates second operational data by duplicating said first operational data, and said operation data transmission portion transmits said second operational data to said second slave display terminal.

5. A remote operation apparatus comprising a master display terminal and at least a slave display terminal, coupled to said master terminal through at least a network, to be remote controlled by said master display terminal, said master display terminal including:

a video data receiving portion for receiving first video data from said slave display terminal;

a first display portion, having a first display;

a display control portion for operating said first display portion to display a first image in accordance with said first video data with positions of said first image controlled in accordance with first positional data;

a screen parameter data input portion for inputting a request;

a screen parameter data generation portion responsive to said inputted request for generating screen parameter data including said first positional data;

a screen parameter transmission portion for transmitting said screen parameter data to said a slave display terminal;

a first operational data input portion for receiving first operational data input;

an operational data generation portion for generating first operational data in accordance with said first operational data input and converting said first positional data to second positional data; and an operational data transmission portion for transmitting said first operational data and second positional data to said slave display terminal, said slave display terminal including:

an operational data receiving portion for receiving said first operation data and said second positional data from said operational data transmission portion through said network;

a second operational data input portion for inputting second operational data including position data;

a task operation portion including a plurality of tasks and a task detection portion, wherein said task detection portion detects one of said plurality of tasks corresponding to said first operational data and said received second positional data and said task operation portion supplying said first operational data and said second positional data from said operational data receiving portion to the detected one of said plurality of tasks to operate it to generate a first drawing command using said second positional data when said operational data receiving portion receives said first operation data and said second positional data, said task detection portion detects one of said plurality of tasks corresponding to said second operational data and said received position data and said task operation portion supplying said second operational data and position data from said second operational data input portion to the detected one of said plurality of tasks corresponding to said second operational data and said position data to operate it to generate a second drawing commands when said second operational data input portion receives said second operational data and said position data, a second display portion, having a second display, for generating second video data in accordance with said first and second drawing commands to display a second image on said second display;

a screen parameter receiving portion for receiving said screen parameter data from said screen parameter transmission portion;

a screen data acquisition portion for generating said first video data from said second video data from said second display portion in accordance with said screen parameter data from said screen parameter receiving portion; and a video data transmission portion for transmitting said first video data from said video data acquisition portion to said video data receiving portion, wherein said at least a slave display terminal comprises first and second slave video terminals to which first and second addresses assigned respectively, said display control portion stores third positional data of screen areas of said first and second slave display terminals such that said screen areas form an imaginary screen area having coordinates, each of said screen areas being uniquely represented by said third positional data on said coordinates, and said master video terminal further comprises:

a display region input portion for inputting and supplying a display request including fourth positional data on said coordinates indicative of a region at said screen area of said first slave display terminal to said display control portion, said display control portion judging which of said first and second address data corresponds to said region by comparing said fourth positional data with said third positional data and converting said fourth positional data to said first positional data and operating said screen parameter data generation portion to generate said screen parameter data in accordance with said display request so as to operate one of said first and second slave display terminals to transmit said first video data of an image at said region of said one of said first and second slave display terminals which is selected in accordance with the judged address, to said master display terminal.

6. A remote operation apparatus comprising a master display terminal and at least a slave display terminal, coupled to said master terminal through at least a network, to be remote controlled by said master display terminal, said master display terminal including:

a video data receiving portion for receiving first video data from said slave display terminal;

a first display portion, having a first display;

a display control portion for operating said first display portion to display a first image in accordance with said first video data with positions of said first image controlled in accordance with first positional data;

a screen parameter data input portion for inputting a request;

a screen parameter data generation portion responsive to said inputted request for generating screen parameter data including said first positional data;

a screen parameter transmission portion for transmitting said screen parameter data to said a slave display terminal;

a first operational data input portion for receiving first operational data input;

an operational data generation portion for generating first operational data in accordance with said first operational data input and converting said first positional data to second positional data; and an operational data transmission portion for transmitting said first operational data and second positional data to said slave display terminal, said slave display terminal including:

an operational data receiving portion for receiving said first operation data and said second positional data from said operational data transmission portion through said network;

a second operational data input portion for inputting second operational data including position data;

a task operation portion including a plurality of tasks and a task detection portion, wherein said task detection portion detects one of said plurality of tasks corresponding to said first operational data and said received second positional data and said task operation portion supplying said first operational data and said second positional data from said operational data receiving portion to the detected one of said plurality of tasks to operate it to generate a first drawing command using said second positional data when said operational data receiving portion receives said first operation data and said positional data, said task detection portion detects one of said plurality of tasks corresponding to said second operational data and said received position data and said task operation portion supplying said second operational data and position data from said second operational data input portion to the detected one of said plurality of tasks corresponding to said second operational data and said second position data to operate it to generate a second drawing commands when said second operational data input portion receives said second operational data and said position data, a second display portion, having a second display, for generating second video data in accordance with said first and second drawing commands to display a second image on said second display;

a screen parameter receiving portion for receiving said screen parameter data from said screen parameter transmission portion;

a screen data acquisition portion for generating said first video data from said second video data from said second display portion in accordance with said screen parameter data from said screen parameter receiving portion; and a video data transmission portion for transmitting said first video data from said video data acquisition portion to said video data receiving portion, wherein said at least a slave display terminal comprises first and second slave video terminals, said first operational data input portion further receives a data transmission request, said operational data generation portion generates said first operational data indicative of said data transmission request, said master display terminal further comprises a data control portion, a first data transmission and receiving portion, and a first data storing portion, said operational data generation portion generates said first operational data indicative of said data transmission request, said operational data transmission portion transmits said first operational data indicative of said data transmission request to said task operation portion via said operation data receiving portion of said first slave display terminal, said first and second slave display terminals further include second and third data storing portions and second and third data transmission and receiving portions respectively, said task operation portion of said first slave display terminal operates one of said plurality of tasks corresponding said first operational data indicative of said data transmission request to generate data and store said data in said second data storing portion of said first slave display terminal and operates said second data transmission and receiving portion of said first display terminal to transmit said data to said first data transmission and receiving portion of said master display terminal, said first data storing portion stores said data from said first data transmission and receiving portion, said operational data input portion further receives a data pasting request, in response to said first operational data indicative of said data pasting request, said operational data generation portion generates said first operational data indicative of said data pasting request, said data control portion reads said data in said first data storing portion and transmits said data from said first data storing portion to said second data transmission and receiving portion of said second slave display terminal, and said second data storing portion of said second slave display terminal stores said data from said data transmission and receiving portion of said second slave display terminal to supply said data in said second data storing portion of said second slave display terminal to said task control portion of said second slave display terminal.

* * * * *